US012711941B1

(12) United States Patent
Mahajan et al.

(10) Patent No.: US 12,711,941 B1
(45) Date of Patent: Aug. 18, 2026

(54) NOTIFICATION MANAGEMENT FOR MULTI-ASSISTANT ARTIFICIAL INTELLIGENCE

(71) Applicant: Amazon Technologies, Inc., Seattle, WA (US)

(72) Inventors: Mayank Mahajan, Bellevue, WA (US); Daniel Yim, Seattle, WA (US); Anurag Kartikeya Akkiraju, Pembroke Pines, FL (US); Rashmi Sutodia, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 18/539,393

(22) Filed: Dec. 14, 2023

(51) Int. Cl.
*G10L 15/22* (2006.01)
*G10L 13/02* (2013.01)
*H04L 67/55* (2022.01)

(52) U.S. Cl.
CPC .............. *G10L 13/02* (2013.01); *G10L 15/22* (2013.01); *H04L 67/55* (2022.05); *G10L 2015/223* (2013.01)

(58) Field of Classification Search
CPC ......... G10L 15/18; G10L 15/22; G10L 13/00; G06F 3/167
See application file for complete search history.

(56) References Cited

U.S. PATENT DOCUMENTS 6,795,808 B1 9/2004 Strubbe et al.
7,415,413 B2 * 8/2008 Eide ...................... G10L 13/033 704/251
8,599,014 B2 12/2013 Prykari et al.
8,818,344 B2 8/2014 Forbes et al.
9,318,108 B2 4/2016 Gruber et al.
9,570,065 B2 * 2/2017 Pollet .................... G10L 13/027
9,571,645 B2 2/2017 Quast et al.
9,576,574 B2 2/2017 van Os et al.
(Continued)

FOREIGN PATENT DOCUMENTS

WO WO-2017161139 A1 * 9/2017 ............ G06F 3/167

OTHER PUBLICATIONS

International Preliminary Report on Patentability mailed on Aug. 11, 2022 for International Patent Application No. PCT/US2021/012144, filed Jan. 5, 2021.

*Primary Examiner* — Daniel Abebe
(74) *Attorney, Agent, or Firm* — Pierce Atwood LLP

(57) ABSTRACT

A speech-processing system may provide access to multiple virtual assistants via a user device. A user may invoke a particular virtual assistant by speaking its wakeword. The virtual assistants may send notifications to the user via the user device, which may present an indication of the available notifications. The user may request delivery of the notifications using, for example, a voice user interface. When delivering notifications from multiple virtual assistants, the system may use distinct voice and/or visual characteristics to indicate a source of the notifications. For example, after delivering a first notification corresponding to a first virtual assistant (e.g., the one invoked by the user at the beginning of the interaction) the first virtual assistant may offer to deliver a second notification from a second virtual assistant. The second virtual assistant may deliver the second notification using voice/visual characteristics different from those used for the first notification.

20 Claims, 14 Drawing Sheets

(56) References Cited

U.S. PATENT DOCUMENTS

| | | | | |
|---|---|---|---|---|
| 9,654,645 | B1 | 5/2017 | Kamat et al. | |
| 9,774,979 | B1 | 9/2017 | Morishita et al. | |
| 9,875,734 | B2 | 1/2018 | Agrawal et al. | |
| 10,057,736 | B2 | 8/2018 | Gruber et al. | |
| 10,163,074 | B2 | 12/2018 | Wilkerson | |
| 10,319,375 | B2 | 6/2019 | Fritz et al. | |
| 10,402,450 | B2 | 9/2019 | Goodman et al. | |
| 10,470,020 | B2 | 11/2019 | Lockenour | |
| 10,547,729 | B2 | 1/2020 | Choi et al. | |
| 10,650,128 | B2 | 5/2020 | Nowak et al. | |
| 10,721,356 | B2 | 7/2020 | Segalis et al. | |
| 10,733,685 | B1 | 8/2020 | Gailloux et al. | |
| 11,037,558 | B2 | 6/2021 | Trim et al. | |
| 11,064,339 | B2 | 7/2021 | Hamre et al. | |
| 11,120,372 | B2 | 9/2021 | Gruber et al. | |
| 11,140,116 | B2 | 10/2021 | Laller | |
| 11,170,285 | B2 * | 11/2021 | Aggarwal | G06N 5/04 |
| 11,231,975 | B2 | 1/2022 | Chalmers et al. | |
| 11,322,150 | B2 | 5/2022 | Nadig et al. | |
| 11,334,383 | B2 | 5/2022 | Rakshit et al. | |
| 11,455,998 | B1 | 9/2022 | Nadig et al. | |
| 11,490,240 | B2 | 11/2022 | Lu et al. | |
| 11,531,940 | B2 | 12/2022 | Gupta et al. | |
| 11,562,744 | B1 * | 1/2023 | Gao | G10L 13/033 |
| 11,783,805 | B1 | 10/2023 | Nadig et al. | |
| 11,995,483 | B2 * | 5/2024 | Chalmers | H04L 51/224 |
| 2011/0270517 | A1 | 11/2011 | Benedetti | |
| 2014/0337424 | A1 | 11/2014 | Lee et al. | |
| 2015/0193379 | A1 | 7/2015 | Mehta | |
| 2017/0099592 | A1 | 4/2017 | Loeb et al. | |
| 2017/0149716 | A1 | 5/2017 | Mostachetti et al. | |
| 2018/0020093 | A1 | 1/2018 | Bentitou et al. | |
| 2020/0184967 | A1 * | 6/2020 | Gupta | B60K 35/10 |
| 2020/0185078 | A1 | 6/2020 | Pauws et al. | |
| 2020/0211553 | A1 | 7/2020 | Bohl et al. | |
| 2021/0335342 | A1 | 10/2021 | Yuan et al. | |
| 2022/0358930 | A1 | 11/2022 | Nadig et al. | |
| 2022/0366889 | A1 * | 11/2022 | Yerroju | G10L 15/22 |
| 2023/0120966 | A1 | 4/2023 | Nadig et al. | |

* cited by examiner

System 100
Assistant 1 Publisher 115a
Assistant 2 Publisher 115b
System Component(s) 120
Notification Gateway 160
Assistant Resolution 172
Notification Component 170
Assistant Metadata Component 175
Notification DB 177
Target DB 185
Notification Delivery 180
Notification Skill 190
1
2
3
4
5
6
7
8
9
10
Speech-Detection Device(s) 110a
Speech-Detection Device(s) w/ Display 110b

FIG. 1B

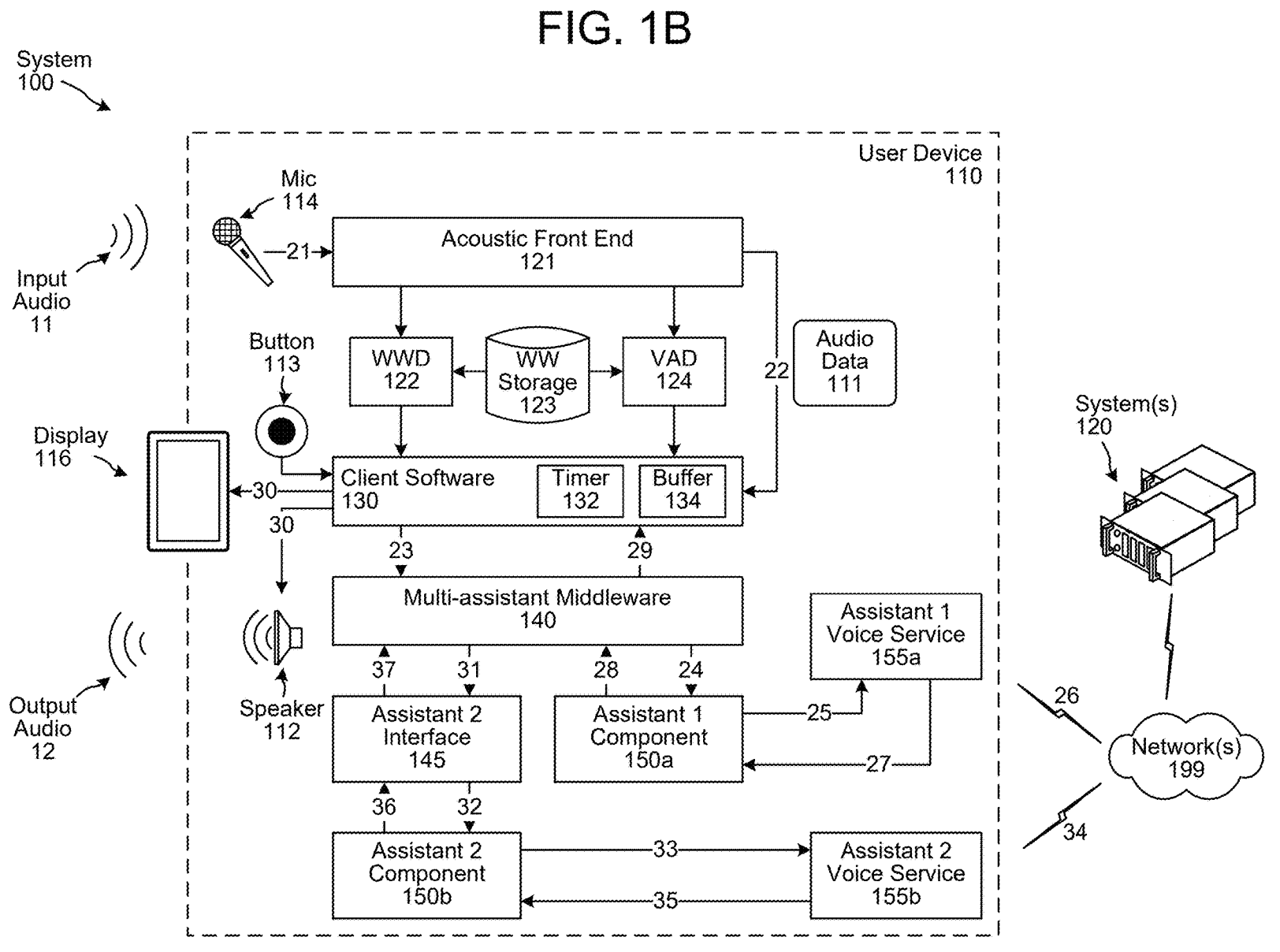

System 100
Input Audio 11
Display 116
Output Audio 12
User Device 110
Mic 114
Button 113
Speaker 112
Acoustic Front End 121
WWD 122
WW Storage 123
VAD 124
Audio Data 111
Client Software 130
Timer 132
Buffer 134
Multi-assistant Middleware 140
Assistant 1 Component 150a
Assistant 2 Interface 145
Assistant 2 Component 150b
Assistant 1 Voice Service 155a
Assistant 2 Voice Service 155b
System(s) 120
Network(s) 199
21
22
23
24
25
26
27
28
29
30
30
31
32
33
34
35
36
37

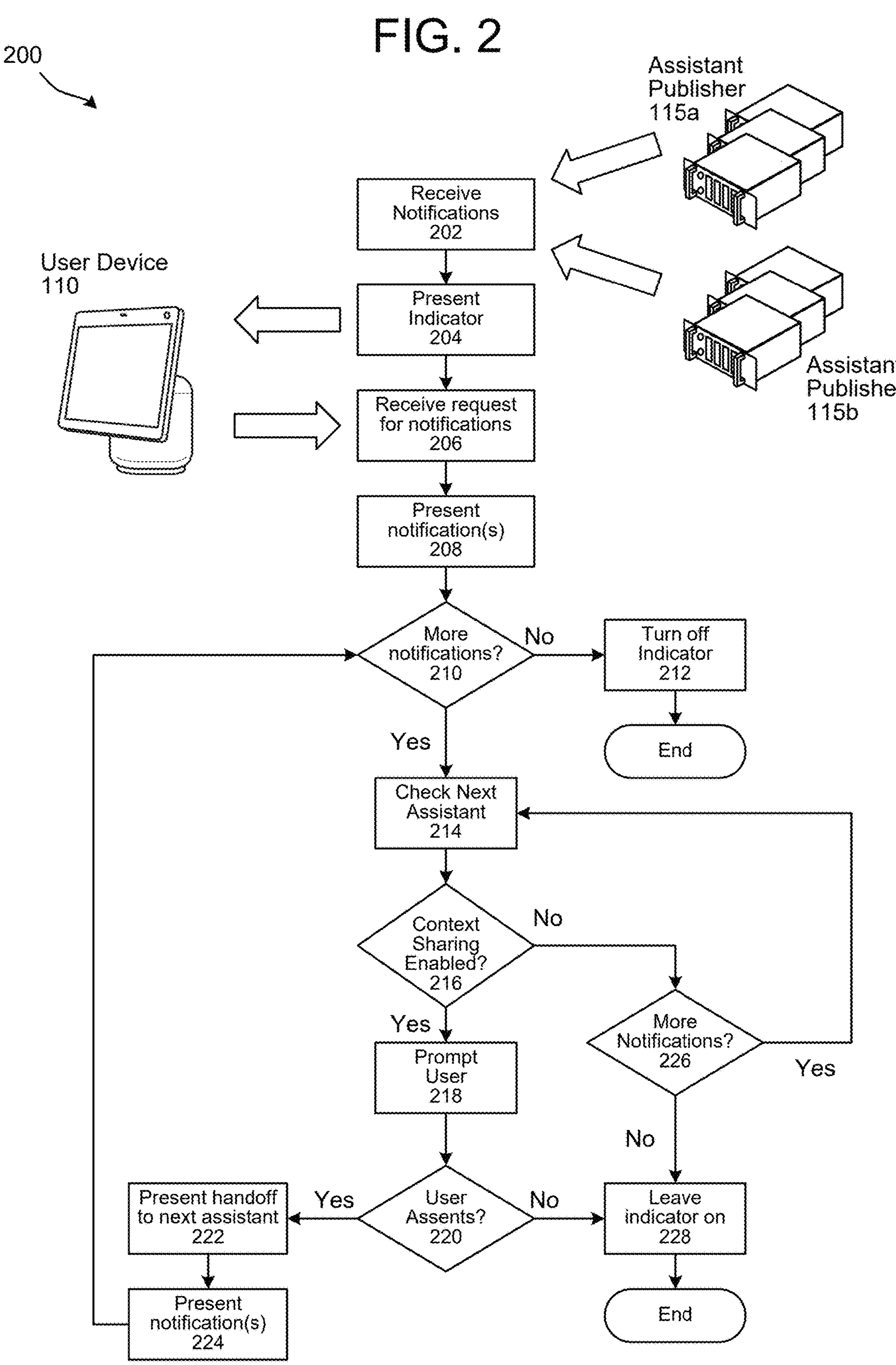
FIG. 2
200
Assistant Publisher 115a
Assistant Publisher 115b
User Device 110
Receive Notifications 202
Present Indicator 204
Receive request for notifications 206
Present notification(s) 208
More notifications? 210
No
Yes
Turn off Indicator 212
End
Check Next Assistant 214
Context Sharing Enabled? 216
No
Yes
More Notifications? 226
Yes
No
Prompt User 218
User Assents? 220
Yes
No
Present handoff to next assistant 222
Present notification(s) 224
Leave indicator on 228
End

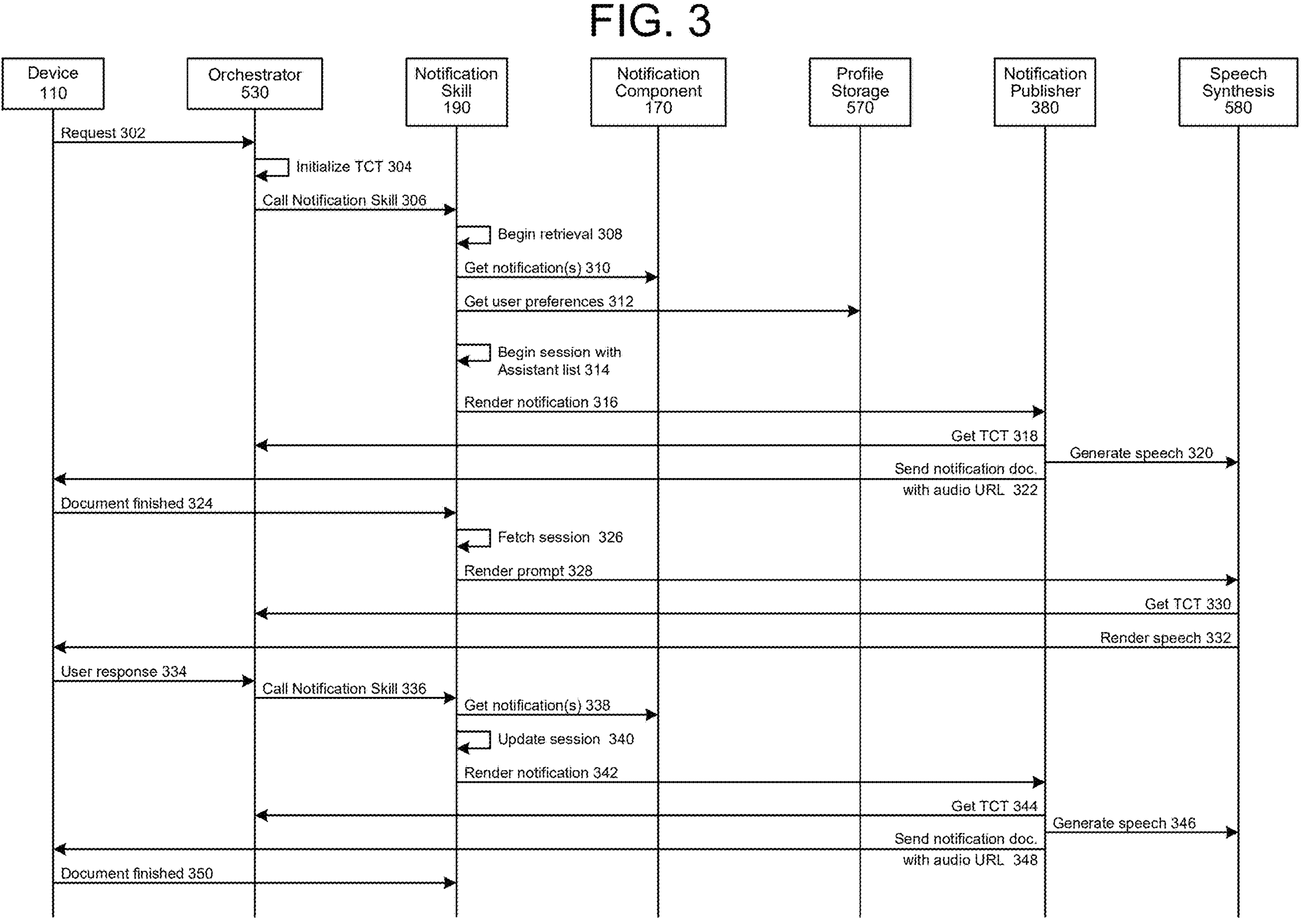
FIG. 3
Device 110
Orchestrator 530
Notification Skill 190
Notification Component 170
Profile Storage 570
Notification Publisher 380
Speech Synthesis 580
Request 302
Initialize TCT 304
Call Notification Skill 306
Begin retrieval 308
Get notification(s) 310
Get user preferences 312
Begin session with Assistant list 314
Render notification 316
Get TCT 318
Generate speech 320
Send notification doc. with audio URL 322
Document finished 324
Fetch session 326
Render prompt 328
Get TCT 330
Render speech 332
User response 334
Call Notification Skill 336
Get notification(s) 338
Update session 340
Render notification 342
Get TCT 344
Generate speech 346
Send notification doc. with audio URL 348
Document finished 350

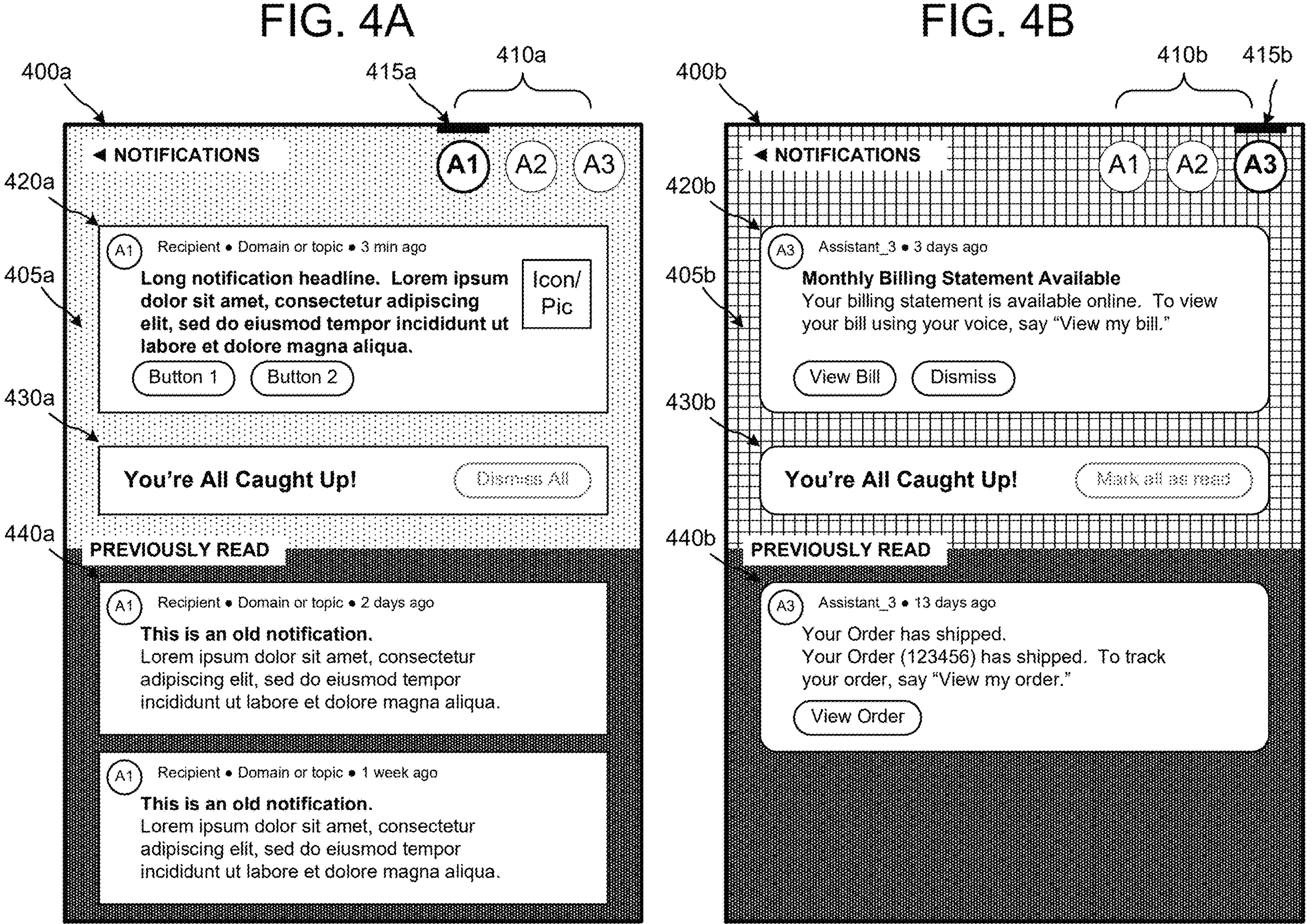

FIG. 4A
400a
415a
410a
NOTIFICATIONS
A1
A2
A3
420a
405a
430a
440a
Recipient • Domain or topic • 3 min ago
Long notification headline. Lorem ipsum dolor sit amet, consectetur adipiscing elit, sed do eiusmod tempor incididunt ut labore et dolore magna aliqua.
Icon/ Pic
Button 1
Button 2
You're All Caught Up!
Dismiss All
PREVIOUSLY READ
Recipient • Domain or topic • 2 days ago
This is an old notification.
Lorem ipsum dolor sit amet, consectetur adipiscing elit, sed do eiusmod tempor incididunt ut labore et dolore magna aliqua.
Recipient • Domain or topic • 1 week ago
This is an old notification.
Lorem ipsum dolor sit amet, consectetur adipiscing elit, sed do eiusmod tempor incididunt ut labore et dolore magna aliqua.
FIG. 4B
400b
410b
415b
NOTIFICATIONS
A1
A2
A3
420b
405b
430b
440b
Assistant_3 • 3 days ago
Monthly Billing Statement Available
Your billing statement is available online. To view your bill using your voice, say "View my bill."
View Bill
Dismiss
You're All Caught Up!
Mark all as read
PREVIOUSLY READ
Assistant_3 • 13 days ago
Your Order has shipped.
Your Order (123456) has shipped. To track your order, say "View my order."
View Order

FIG. 5

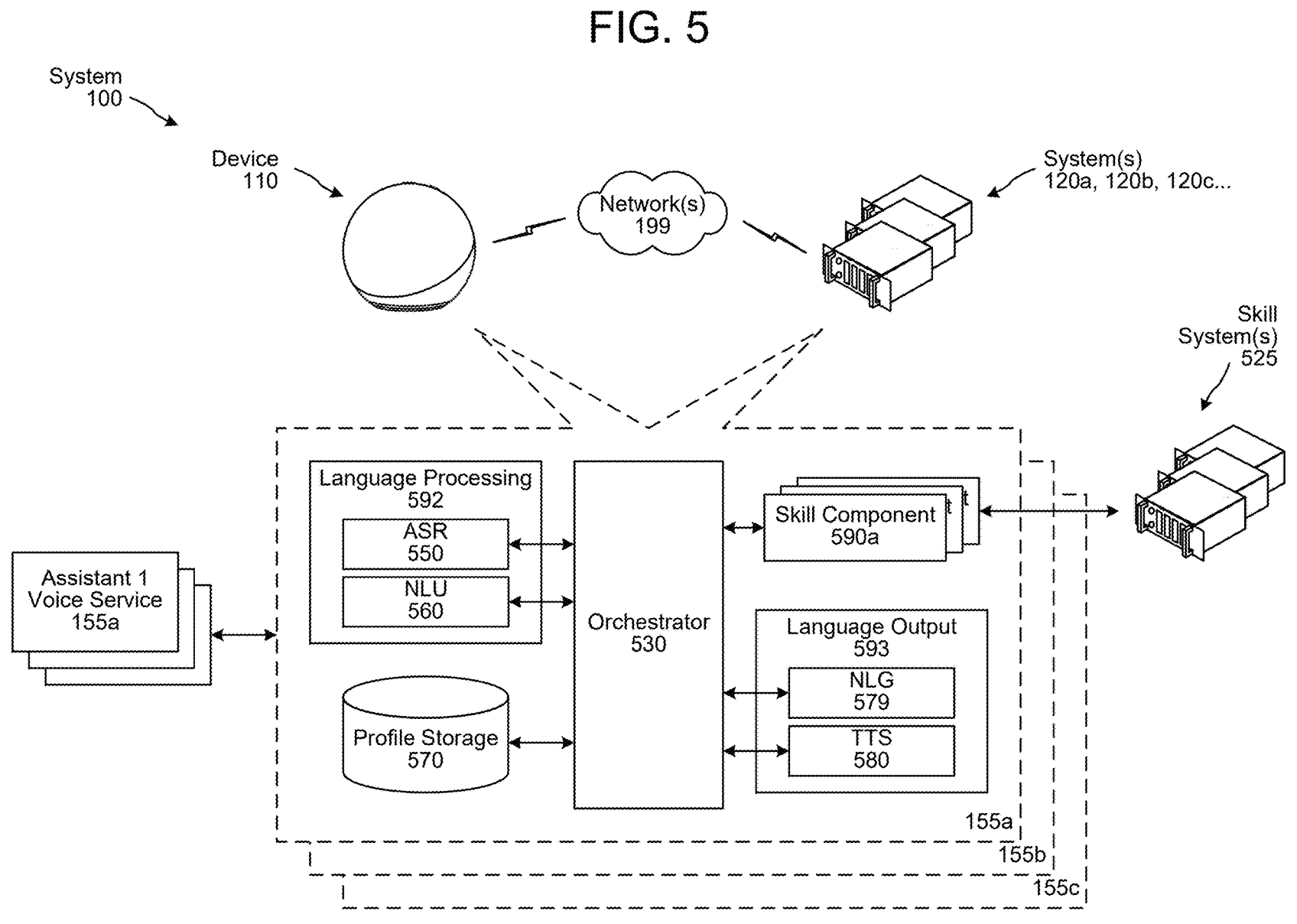

System 100

Device 110

Network(s) 199

System(s) 120a, 120b, 120c...

Skill System(s) 525

155a

155b

155c

Language Processing 592

ASR 550

NLU 560

Profile Storage 570

Orchestrator 530

Skill Component 590a

Language Output 593

NLG 579

TTS 580

Assistant 1 Voice Service 155a

System 100
Device 110
Network(s) 199
System(s) 120
Skill System(s) 525
Skill System(s) 625
Assistant 1 Voice Service 155a
Language Processing 592
ASR 550
NLU 560
Language Output 593
NLG 579
TTS 580
Profile Storage 570
Orchestrator 530
First assistant skills 690
Skill Component 590a
Multi-Assistant Component 615
Second assistant skills 691
Skill Component 690a NLU Storage 873
874n
874b
874a
Skill System 1 Intents
Skill System
Skill System 1 Grammar
Skill System
876n
876b
876a
Entity Library 882
884n
884c
884b
884a
886an
886ab
886aa
Gazetteer C
Gazetteer B
Gazetteer A
Skill System 1 Lexicon
Skill System
Knowledge Base(s) 872
NLU 560
Shortlister 850
Recognizer 863
NER 862
IC 864
System 120

FIG. 9

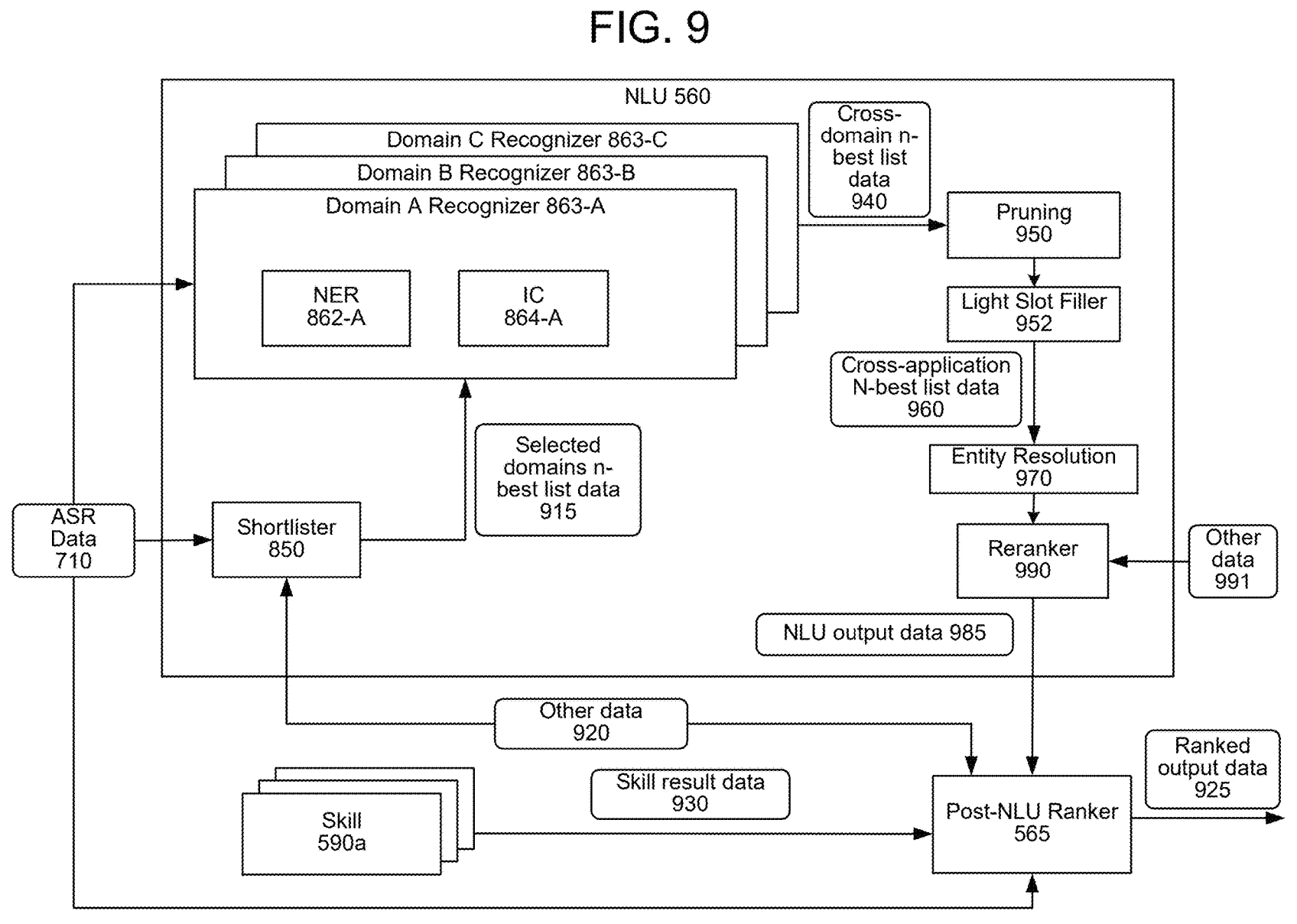

NLU 560
Domain C Recognizer 863-C
Domain B Recognizer 863-B
Domain A Recognizer 863-A
NER 862-A
IC 864-A
Cross-domain n-best list data 940
Pruning 950
Light Slot Filler 952
Cross-application N-best list data 960
Entity Resolution 970
Reranker 990
Other data 991
NLU output data 985
Selected domains n-best list data 915
Shortlister 850
ASR Data 710
Other data 920
Skill result data 930
Skill 590a
Post-NLU Ranker 565
Ranked output data 925

Synthesized Speech Audio Data 1095
Vocoder 1090
TTS Output Data 1045
Other Output Data 1055
TTS Component 580
TTS Model 1060
Preprocessing 1020
Voice Profile Storage 1085
Text Data 1015
Other Input Data 1025

Device 110
Network(s) 199
Antenna 1122
Microphone(s) 114
Speaker 112
Display 116
Camera 1118
I/O Device Interfaces 1102
Controller(s) / Processor(s) 1104
Memory 1106
Storage 1108
Bus 1124

FIG. 12

System(s) 120/125

Bus 1224

I/O Device Interfaces 1202

Controller(s) / Processor(s) 1204

Memory 1206

Storage 1208

Network(s) 199

FIG. 13

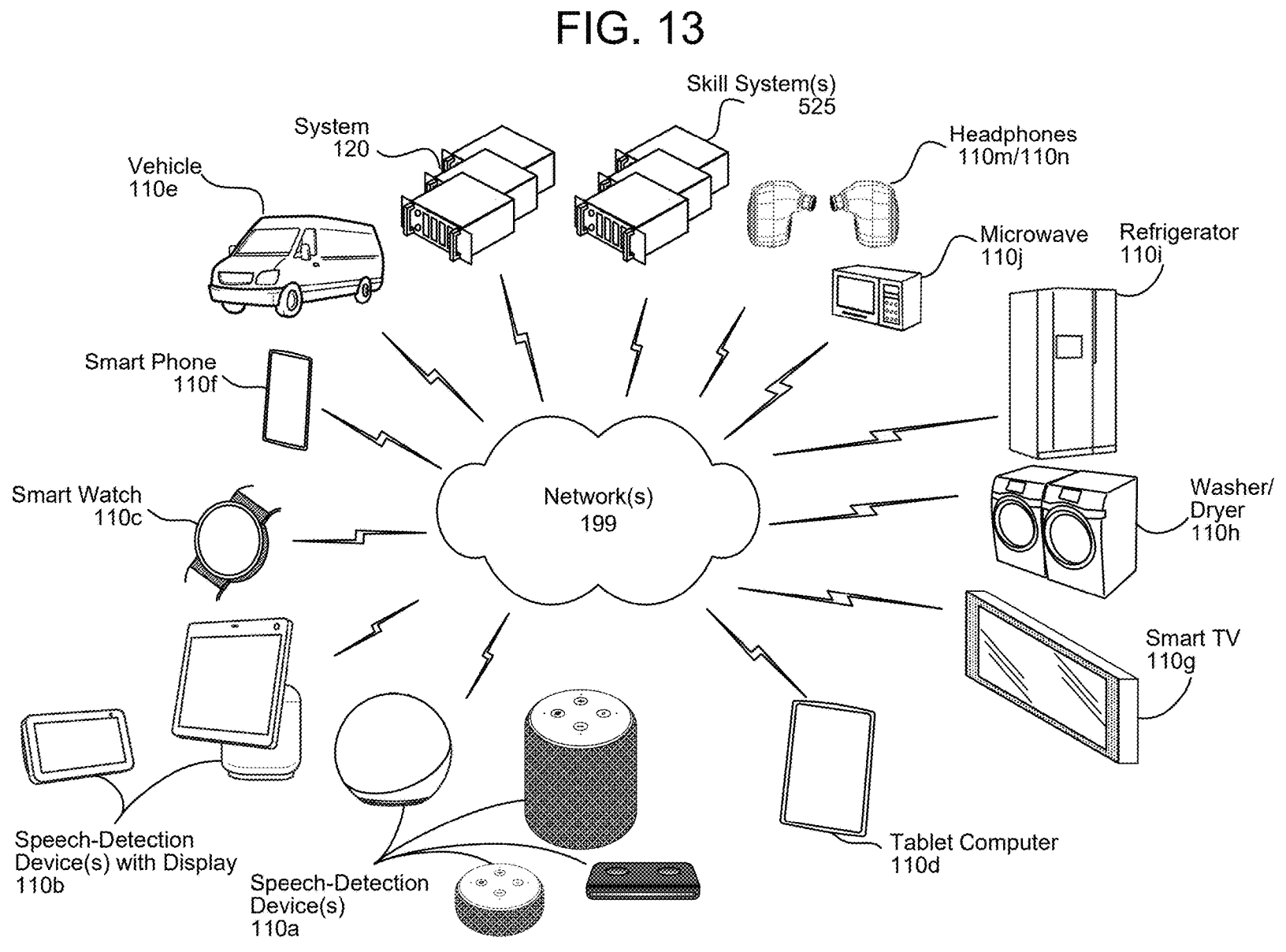

Network(s)
199

System
120

Skill System(s)
525

Vehicle
110e

Smart Phone
110f

Smart Watch
110c

Speech-Detection
Device(s) with Display
110b

Speech-Detection
Device(s)
110a

Tablet Computer
110d

Smart TV
110g

Washer/
Dryer
110h

Refrigerator
110i

Microwave
110j

Headphones
110m/110n

NOTIFICATION MANAGEMENT FOR MULTI-ASSISTANT ARTIFICIAL INTELLIGENCE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating further details of the multi-assistant system, according to embodiments of the present disclosure.

FIG. 2 is a flowchart illustrating an example method of providing notifications from multiple virtual assistants, according to embodiments of the present disclosure.

FIG. 3 is a signal flow diagram illustrating example operations of the multi-assistant notification system providing notifications from multiple virtual assistants, according to embodiments of the present disclosure.

FIGS. 4A and 4B are conceptual diagrams illustrating an example graphical user interface providing notifications from multiple virtual assistants, according to embodiments of the present disclosure.

FIG. 5 is a conceptual diagram illustrating components that may be included in a first example implementation of the multi-assistant notification system, according to embodiments of the present disclosure.

FIG. 9 is a conceptual diagram of how natural language processing is performed, according to embodiments of the present disclosure.

FIG. 12 is a block diagram conceptually illustrating example components of a system, according to embodiments of the present disclosure.

FIG. 13 illustrates an example of a computer network for use with the overall system, according to embodiments of the present disclosure.

DETAILED DESCRIPTION

Figure 1A:
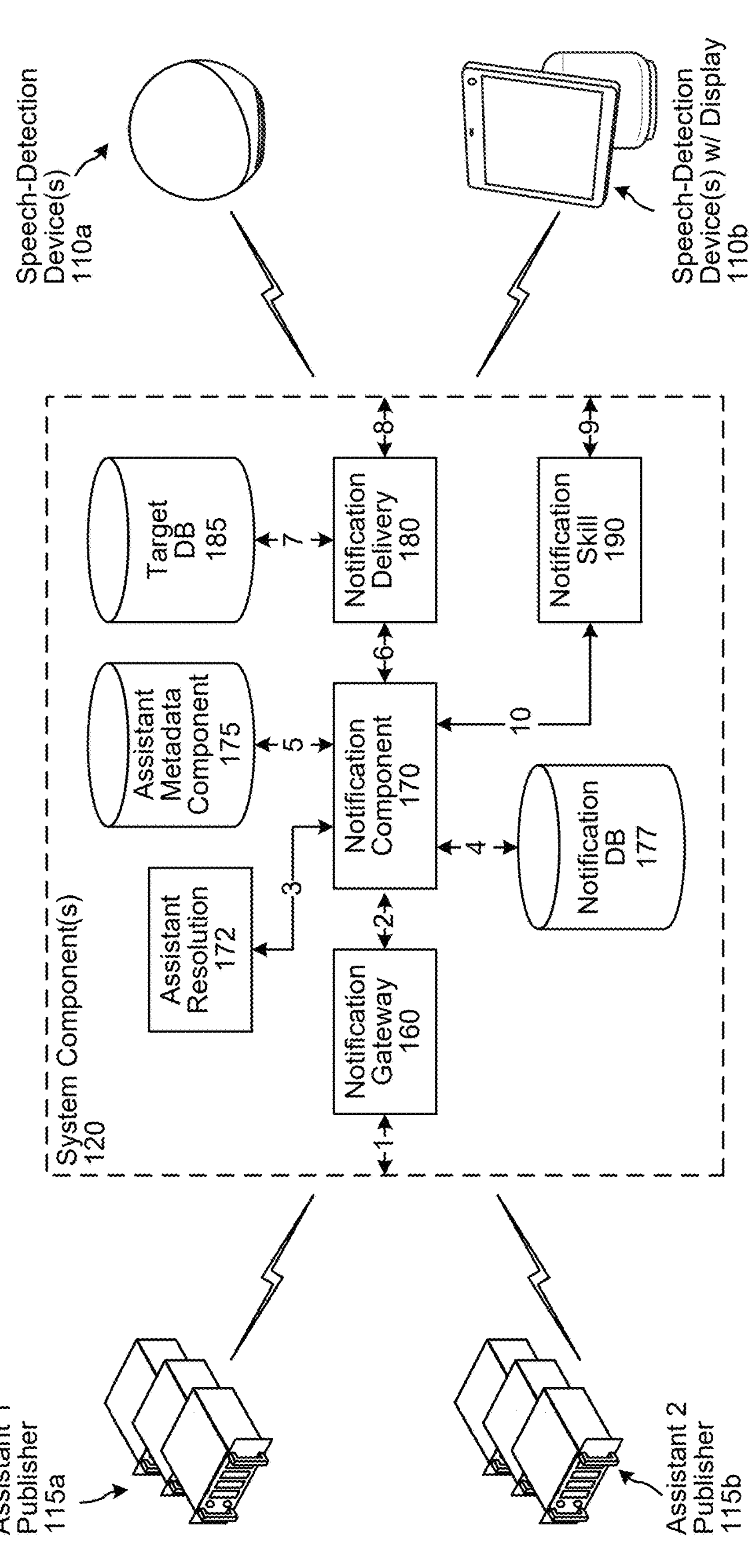
FIG. 1A is a conceptual diagram illustrating components of a multi-assistant notification system, according to embodiments of the present disclosure.

Speech processing systems and speech generation systems have been combined with other services to create virtual "assistants" that leverage artificial intelligence to allow a user to interact with a computer system using natural language inputs such as speech, text inputs, or the like. The assistant can leverage different computerized voice-enabled artificial intelligence technologies (e.g., machine learning models). Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural language generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing system. The virtual assistant can leverage the speech-processing and speech-generation artificial intelligence technologies as well as additional applications and/or skills to perform tasks for and/or on behalf of the user.

Some voice-controlled devices can provide access to more than one virtual assistant. In a multi-assistant system, a virtual assistant may be associated with its own wakeword. Upon detecting a representation of a wakeword in an utterance, the device may send audio data representing the utterance to a speech-processing system/component corresponding to the virtual assistant associated with the wakeword. The different virtual assistants may have different "personalities" and abilities to provide different services and/or access to different skills. The different virtual assistants may be associated with different indications (e.g., colors, sounds, voice characteristics, etc.) that let the user know which virtual assistant they are interacting with.

Similarly, speech-processing systems may send notifications to the device. The device may present an indication of the notification in the form of an icon on a display, an audible tone, and/or other output. A user may preview, open, and/or delete the notification. The notification may include an indication (e.g., an icon, light, beep, tone, etc.), a headline (e.g., indicating a source and/or summarizing the notification), and/or a body (e.g., including the message and/or other details of the notification). The headline and/or body of the notification may be presented on a display and/or output as synthesized speech (e.g., a computer-generated voice reciting the notification). In a multi-assistant system, the device may receive notifications from multiple speech-processing systems corresponding to different virtual assistants.

Offered herein are systems and methods for enabling a user device to convey notifications from multiple virtual assistants. The systems and methods may operate a graphical user interface (GUI) and/or a voice user interface (VUI) that provides users an intuitive and secure way to receive notifications from different virtual assistants. The systems and methods may differentiate virtual assistants by applying unique voice and/or visual characteristics to notifications and other outputs. For example, different virtual assistants may be associated with different voice characteristics such as a timbre, prosody, accent, and/or vocabulary. Different virtual assistants may also be associated with different visual characteristics (e.g., when presenting output on a display) such as color schemes, patterns, window or tab borders, etc. In this manner, the user may intuitively associate an output with the corresponding virtual assistant.

In some implementations, the systems and methods may allow a user to interact with one virtual assistant to receive notifications from one or more additional virtual assistants. The systems and methods may allow certain context sharing between the virtual assistants to give a primary virtual assistant awareness of notifications associated with the other virtual assistant(s). The systems and methods may, in some embodiments, prevent virtual assistants from observing the notification itself (e.g., the headline and/or body); rather, the primary virtual assistant may receive data representing only the availability of the notification and, in some cases, metadata associated with the notification (e.g., source virtual assistant, time, priority, etc.). Such controls may protect the user's privacy by preventing one virtual assistant system from accessing information of another virtual assistant system that the user may not wish to be shared across the systems while still allowing some combined notification capabilities. The primary virtual assistant may notify the user of pending notifications from itself as well as the other virtual assistant(s). The user may interact with the primary virtual assistant to request presentation of notifications from the other virtual assistant(s). Notifications from the other virtual assistant(s) may be presented using the voice and/or visual characteristics corresponding to the associated virtual assistant, thus allowing the user to recognize the source of the notification.

In some implementations, however, the systems and methods may allow for context blocking such that even the availability of notifications from a virtual assistant are not observable by or otherwise shared with the other virtual assistant(s). The source virtual assistant may send an indication of the notification to a device associated with one or more virtual assistants, and the device may present an indication of the awaiting notification along with indications for notifications corresponding to the other virtual assistant(s). However, the other virtual assistant(s) may not be able to inform the user of or otherwise restrict the sharing of at least some data related to the other notifications. Likewise, the other virtual assistant(s) may not handle requests from the user to present notifications from another virtual assistant. In some implementations, context sharing and blocking may be configured by a user of the device and/or by an administrator of the virtual assistant.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a multi-assistant notification system 100, according to embodiments of the present disclosure. The multi-assistant notification system 100 may include various components such as one or more system components 120 that may receive notification data from one or more assistant publisher systems 115*a*, 115*b*, etc. (collectively "assistant publisher systems 115") and deliver notifications to one or more user devices 110 such as the speech-detection user device 110*a* and speech-detection device with display 110*b* shown in FIG. 1A. In various implementations, the multi-assistant notification system 100 may include more or fewer assistant publisher systems 115 and/or user device 110.

The multi-assistant notification system 100 may provide users with an intuitive and secure interface for receiving notifications from different virtual assistants. For example, the first virtual assistant may be associated with the wakeword "Alexa" and may be the primary virtual assistant of the system 100. The system 100 may provide the user with an interface with additional virtual assistants such as, for example, a vehicle-related virtual assistant associated with the wakeword "Otto," a telephone-related virtual assistant named "Mabelle," and/or others. The user may interact with a virtual assistant by speaking its wakeword, which may trigger the speech-controlled device to begin capturing and processing the user's speech. In some cases, the user may invoke a virtual assistant using a button, touchscreen, or other input to the user device 110. Similarly, a system associated with virtual assistant may interact with the user by sending notifications to the user (in addition to other user-requested and/or system-initiated outputs).

The multi-assistant notification system 100 may include various components and features for maintaining user privacy by, for example, preventing systems associated with one virtual assistant from observing the content of notifications associated with a different virtual assistant. In some cases, the system 100 can block visibility over even the availability of available notifications from other virtual assistants. The extent of context sharing and/or blocking may be configured by user preference and/or by administrators of the various virtual assistants.

The multi-assistant notification system 100 may include one or more system components 120 implementing the following components. Each of the components may be implemented in a combination of hardware and/or software; for example, as computer code executing on the example system component 120 described below with reference to FIG. 12. The components may include a notification gateway 160, a notification component 170, an assistant resolution component 172, an assistant metadata component 175, a notification database (DB) 177, a notification delivery component 180, a target DB 185, and/or a notification skill component 190. The components may reside on a single system component 120 or may be divided or shared between multiple system components 120.

FIG. 1A illustrates example operations for sending notifications to a user via the multi-assistant notification system 100. At a Step 1, the notification gateway 160 may receive notification data from an assistant publisher system 115. In some implementations, the assistant publisher system 115 may be a skill component and/or a skill support system such as the skill components 590 and/or 690 and the skill support system components 525 and 625 shown in FIGS. 5 and 6. The notification gateway 160 may host an application programming interface (API) that the assistant publisher systems 115 can access to transmit the notification data. The notification data may represent various pieces of information and/or metadata such as a user identifier corresponding to a desired recipient of the notification, a virtual assistant identifier corresponding to a source of the notification, and the content (e.g., corresponding to the body) of the notification. In some implementations, the notification data may include additional information such as a notification identifier that uniquely identifies the notification, a hyperlink that the recipient can select to act on the notification, a priority designation (e.g., low, normal, urgent), etc. In some implementation, a notification may include a headline or summary in addition to the body of the notification. In some implementations, the headline and the body of a notification may be presented to the user via different modalities. For example, the user device 110 may present the headline as synthesized speech and present the body on a display (e.g., the display 116 shown in FIGS. 1B and 11).

At a Step 2, the notification gateway 160 may send the notification data to the notification component 170. The notification component 170 may perform one or more operations to prepare the notification for delivery. At a Step 3, the notification component 170 may call on the assistant resolution component 172 to identify the virtual assistant that created the notification. The assistant resolution component 172 may return a virtual assistant identifier corresponding to the source of the notification. At a Step 4, the notification component 170 may store the notification data and the virtual assistant identifier in the notification DB 177.

At a Step 5, the notification component 170 may call on the assistant metadata component 175 to determine which user device or devices to send the notification to. Delivery may be determined based on user and/or virtual assistant administrator configuration. For example, in some cases, a notification may be delivered to all user devices 110 corresponding to the user. This may be the case for a primary virtual assistant of the system 100. In some cases, a notification may be delivered only to user device 110 for which the wakeword of the source virtual assistant is enabled. This may prevent notifications from a particular assistant from being delivered to devices where the user does not use or intend to use that virtual assistant.

The assistant metadata component 175 may return one or more device identifiers corresponding to user devices 110 where the notification should be delivered. For example, for a notification from the first assistant publisher system 115*a*, the assistant metadata component 175 may determine that the corresponding virtual assistant (and/or its wakeword) is enabled for the first user device 110*a* but not the second user device 110*b*. Accordingly, an indication of the notification will be sent to the first user device 110*a* but not the second user device 110*b*.

At a Step 6, the notification component 170 may send the notification data to the notification deliver component 180. The notification delivery component 180 may handle the list mile of delivery of an indication of the notification by, for example, determining an endpoint corresponding to the user device or devices that are to receive delivery of the notification. At a Step 7, the notification delivery component 180 may call on the target DB 185 to determine, for the one or more receiving user devices 110, an endpoint (e.g., an address) and/or a device type (e.g., whether the device is a smart speaker device such as the speech-detection user device 110*a* or a multimodal device such as the speech-detection device with display 110*b*). Different device types may output different indications of an available notification. For example, a smart-speaker device may illuminate a light indicator such as a light-emitting diode (LED) ring and/or output a beep, tone, synthesized speech, and/or some other audible indication of the awaiting notification. A multimodal device may output one or more of the same indicators as a smart speaker device and, in addition, may also present an icon or other visual indicator on its display.

At a Step 8, the notification delivery component 180 may send data and/or metadata representing the notification to the user device(s) 110. The data representing the notification may include less than all of the notification data. For example, rather than include the headline or body of the notification, the data may include information on the source virtual assistant and the type of indication the user device(s) 110 are to present (e.g., via a light, display, and/or speaker of the user device(s) 110). The user device(s) 110 may present the indicator(s) to inform the user of the awaiting notification.

The user may interact with one or more of the virtual assistants to retrieve and listen to and/or read the notification(s). At a Step 9, the system 100 may receive a request via a user device 110 to present available notifications. The request may be handled by the notification skill component 190. The notification skill component 190 may be, for example, one of the skill components 590 and/or 690 described below with reference to FIGS. 5 and/or 6. At a Step 10, the notification skill component 190 may call on the notification component 170 to retrieve the awaiting notification(s). Notification retrieval and presentation is discussed in further detail below with reference to FIGS. 2, 3, 4A, and 4B.

FIG. 1B is a conceptual diagram illustrating further operations for sending notifications to a user via the multi-assistant system 100, according to embodiments of the present disclosure. FIG. 1B illustrates various components of the user device 110 and/or system component(s) 120 that facilitate multi-assistant operations. The system 100 may include a user device 110 in communication with one or more remote system components 120 via one or more computer networks 199. FIG. 13 illustrates other example devices 110 that may be part of a multi-assistant system 100 such as a vehicle 110*e*, a smart watch 110*c*, a speech-detection device with display 110*b*, etc. The user device 110 may include various components for input and output such as one or more displays 116, one or more microphones 114, one or more speakers 112, and/or buttons 113, etc. In some implementations, the button 113 may be touch sensitive (e.g., non-mechanical), a softkey (e.g., programmable to have different functions or trigger different operations), and/or be presented via a touchscreen, etc. At least one of the buttons 113 may activate the microphone 114 and allow the system 100 to receive verbal commands and requests from a user. In some implementations, the system 100 may detect various gestures (e.g., non-physical movements) that indicate the system 100 is to receive an input such as audio 11. The system 100 may respond to the user by various means including synthesized speech (e.g., emitted by the speaker 112) conveying a natural language message. Various components of the system 100 as described with reference to FIGS. 1A and 1B (as well as with reference to FIGS. 5 and 6) may reside on the user device 110, a second user device 110 (e.g., a smart phone 110*f*), and/or the system component 120. In some implementations, various components of the system 100 may be shared, duplicated, and/or divided between the user device(s) 110 and/or the system component 120. FIG. 1B illustrates various components of the system 100 that may be configured to determine the presence (or absence) of one or more wakewords in a received utterance and handling the input accordingly. The various components may be software, logic on separate chips, separate dies on a system on chip (SoC), etc. The components may be embodied in a single executable where an individual component may be process or subroutine of the executable.

Figure 6:
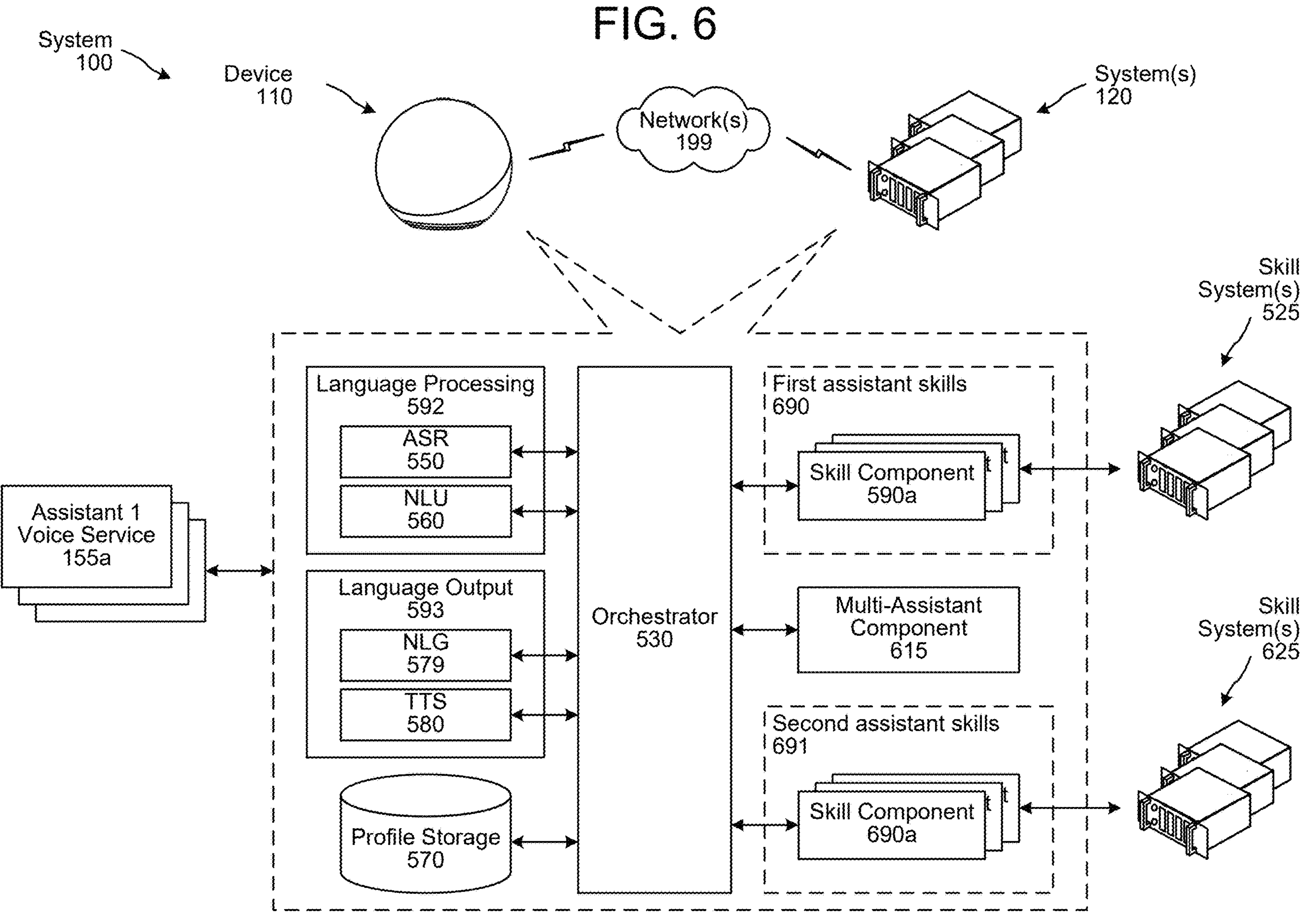
FIG. 6 is a conceptual diagram illustrating components that may be included in a second example implementation of the multi-assistant notification system, according to embodiments of the present disclosure.

At a Step 21, the user device 110 may receive a request for delivery of an awaiting notification or notifications. The request may be, for example, in the form of a verbal command spoken to the user device 110. In some cases, however, the request may be input via touchscreen (e.g., using the display 116), and/or other peripheral such as a keyboard. The request may be handled by a virtual assistant. The user device 110 may provide the user with access to one or more virtual assistants. A virtual assistant may be configured with certain functionalities that it can perform for and/or on behalf of the user. A virtual assistant may further be configured with certain identifying characteristics that may be output to the user to indicate which virtual assistant is receiving input (e.g., listening via the microphone 114), processing (e.g., performing ASR, NLU, and/or executing actions), and/or providing output (e.g., speaking via TTS). A user may invoke a particular virtual assistant by, for example, speaking a wakeword associated with that virtual assistant. The system 100 may determine which virtual assistant is to handle the utterance, and process the utterance accordingly; for example, by sending data representing the utterance to the particular speech processing system corresponding to the virtual assistant as illustrated in FIG. 5 and/or processing the utterance using a configuration corresponding to the virtual assistant as illustrated in FIG. 6.

The system 100 may be configured with a primary or default virtual assistant such that if the user utters a command or request without a wakeword, the system 100 will determine that the utterance should be handled by the default virtual assistant. For example, the user device 110 may include a button 113 that may activate the microphone 114 and indicate to the system 100 to begin receiving audio 11 and processing the resulting audio data. When the user selects the button 113, the microphone 114 may receive audio 11, and generate audio data. The system 100 may process the audio data to determine whether the audio data includes representations of one or more wakewords. If the system 100 does not detect any known wakewords in the audio data, the system 100 may determine that the utterance is intended for the default virtual assistant. If the system 100 detects a known wakeword, however, the system 100 may determine that the utterance is intended for the virtual assistant corresponding to the wakeword. The system 100 may handle further processing of the utterance depending on the determined virtual assistant.

The system 100 may include an acoustic front end (AFE) 121 that may receive the voice data from the microphone 114 and generate audio data 111 for processing by downstream components (e.g., ASR, NLU, etc.). The AFE 121 may also provide a representation of the voice data to one or more wakeword detectors 122 and/or a voice activity detector (VAD) 124. The AFE 121 may include processing to filter the voice data. For example, the AFE 121 may perform echo cancelation, noise suppression, beamforming, high- and/or low-pass filtering, etc. The AFE 121 may output both raw audio data and audio data processed using one or more of the aforementioned techniques. The AFE 121 may stream the audio data 111 to the wakeword detector(s) 122, the VAD 124, and/or a buffer 134. The buffer 134 may be a memory or storage configured to store the audio data 111 unless or until the system 100 determines a virtual assistant for handling the audio data 111.

The wakeword detector 122 can receive the audio data 111 from the AFE 121 and process it to detect the presence of one or more wakewords. In some implementations, the system 100 may include multiple wakeword detectors 122 (e.g., corresponding to different wakewords and/or virtual assistants). In some implementations, the system 100 may include a wakeword detector 122 configured to recognize multiple wakewords.

The wakeword detector 122 may be a hardware or software component. For example, the wakeword detector 122 may be executable code that may run without external knowledge of other components. The wakeword detector 122 may be a library that integrates with an application (e.g., the client software 130), where the library contains a description or descriptions (e.g., model parameters) corresponding one or more wakewords. In some implementations, the system 100 may store model parameters and/or other information about wakewords in the wakeword storage 123. The wakeword storage may be volatile, semi-volatile, or non-volatile memory configured to store and output wakeword representational data for the wakeword detector(s) 122. The wakeword storage 123 may include other data and/or metadata for a wakeword, such as wakeword durations. For example, the wakeword storage 123 may include timing information for a wakeword, such as a typical speaking length (e.g., 0.8 seconds, 1.1 seconds, etc.).

The wakeword detector 122 may, in some implementations, output a signal when a representation of a wakeword is detected; for example, the wakeword detector 122 may output a logic 0 when no wakeword is detected, transitioning to a logic 1 if/when a wakeword is detected. The wakeword detector 122 may output the wakeword detection signal to the client software 130 and/or other components of the system 100. For example, in some implementations, the wakeword detector 122 may output a wakeword detection signal to the AFE 121, in response to which the AFE 121 may begin generating and streaming the audio data 111 for processing by the system 100. In some implementations, the wakeword detector 122 may output other metadata upon detecting a wakeword. The other metadata may include a confidence score associated with the detection, fingerprinting (e.g., whether the audio data 111 included a fingerprint signal on the portion representing the wakeword to indicate that the wakeword was output from a media device during, for example, a commercial or other mass media event), and/or other metrics.

The wakeword detector 122 of the user device 110 may process the audio data 111, representing the audio 11, to determine whether speech is represented therein. The user device 110 may use various techniques to determine whether the audio data 111 includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 122 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 122 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

The VAD 124 may be a hardware and/or software component configured to detect the presence of voice-like audio in the audio data 111. The VAD 124 may determine whether voice activity may be present in the audio data based on, for example, the frequency/energy content of the audio data. For example, the VAD 124 may output an indication of voice activity based on detecting energy in the range of 200-4,000 Hz. The output may be a high/low signal indicating that voice activity is or is not detected. In some implementations, the VAD 124 may be a part of the AFE 121, the client software 130, or a standalone hardware or software component. The VAD 124 may provide a VAD signal to the client software 130 and/or other components of the system 100.

The VAD signal may be used to, for example, determine that a user has begun speaking; for example, following detection of a gesture such as a press of the button 113. A user may press the button 113 and pause for some time before speaking. In some implementations, the system 100 can use an output of the VAD 124 as a trigger to start a timer 132 (e.g., as an alternative or in addition to starting a timer when a button signal is received). The client software 130 may be configured to wait 1.2 s before defaulting to the default virtual assistant if no known wakewords are detected, but if a user does not begin speaking until 0.5 s after pressing the button 113, the wakeword detector 122 may not have time to detect a wakeword longer than ~0.7 s before the system 100 defaults to the default virtual assistant. The timer 132 may be configured with an added delay to allow for a delay between receiving the button signal and the beginning of speech; however, the added delay may add to user-perceived latency.

In some implementations, however, the client software 130 may start the timer 132 upon detection of voice activity. For example, the user may press the button 113, and the system 100 may begin generating audio data. After some time, perhaps 0.5 s, the user may begin speaking. The VAD 124 may detect the voice activity and send a resulting VAD signal to the client software 130. The client software 130 may start the timer 132. After a predetermined time (e.g., a threshold amount of time as measured following detection of voice activity), the client software 130 may determine whether the wakeword detector 122 has indicated a detection of a representation of a wakeword in the audio data 111. For example, the threshold duration of time may be equal to a length of the longest wakeword configured for use on the device, plus a margin duration of time. The wakeword length may be a speaking length of the wakeword; for example, the TP95, which is the amount of time within which 95% utterances of the wakeword would fall. Typical TP95 values for various wakewords may range from, for example, 0.5 s to 2.0 s; however, most wakewords may fall within a range of 1 s+/−200 ms. The margin duration may allow for extra time for a user to begin speaking after a button press (e.g., 250-500 ms), or to allow for elongated pronunciations of the wakeword (e.g., 100-200 ms). The margin duration may be set proportionally to the wakeword duration (e.g., an additional 10%, 15%, 20% of time, etc.), or may be set as an absolute amount of time (e.g., 100, 200, 300 ms, etc.). The wakeword length and/or margin duration may be determined using example utterances received and/or stored by the system 100. If the client software 130 determines that the one or more wakewords are undetected during the threshold duration of time, the client software 130 may default to the default virtual assistant. In this manner, the system 100 can reduce the amount of user-perceived latency experienced by a user who begins speaking shortly after pressing the button 113.

In some implementations, the system 100 may perform a more sophisticated analysis of the VAD signal. For example, speech may include silent moments between and within words. A VAD 124 may have a rapid response, on the order of 10 ms. Thus, a VAD signal corresponding to speech may include brief periods (e.g., on the order of tens or hundreds of milliseconds) where the VAD 124 may indicate no voice activity. Similarly, some wakewords may have a VAD signature that is continuous, while others may have gaps in the VAD signal where no voice activity is detected. The wakeword storage 123 may store VAD signatures for wakewords. The VAD 124 and/or the client software 130 may use the VAD signatures to determine that the VAD signal is inconsistent with wakewords enabled for the system 100. For example, the VAD signatures for all enabled wakewords represent continuous voice activity detection for the duration of the wakeword, and the wakewords may all have a duration of between 1 s and 1.25 s. Thus, if the VAD 124 detects a gap in voice activity after, for example, 200 or 300 ms of detected voice activity, the system 100 may determine that the gap is inconsistent with enabled wakewords, and make an early determination (e.g., before the timer 132 has elapsed) that the user has not spoken a wakeword at the beginning of speech.

In some implementations, the VAD signatures may include additional description of VAD signal gaps corresponding to a wakeword. For example, a wakeword such as “Mr. Computer” may have a first segment having 200 ms+/−60 ms of voice activity detected, followed by a second segment having 100 ms+/−20 ms of no voice activity detected, followed by a third segment having 400 ms+/−160 ms of voice activity detected. Another wakeword may have additional segments of voice activity/no voice activity described. The system 100 may, using such VAD signatures, make an early determination that voice activity detected/no voice activity detected segments do not match enabled wakewords, and thus determine that the utterance is intended for the default virtual assistant. In some implementations, the client software 130 or other component may be configured with a trained model, such as a recurrent neural network or classifier, configured to predict whether a VAD signal from the VAD 124 matches enabled wakewords. Such a model may be trained using labeled sample data comprised of speech with and without wakewords.

At a Step 22, the user device 110 may send the audio data 111 to the client software 130. The user device 110 (and/or other components of the system 100) may execute client software 130. The client software 130 may receive detection signals from the wakeword detector(s) 122 and/or VAD 124. The client software 130 may also receive audio data 111 from the AFE 121. The client software 130 may include or interface with a timer 132. The client software 130 may use the timer 132 to determine when to default to a default virtual assistant; for example, in absence of a wakeword signal received prior to a threshold duration of time elapsing. The client software 130 may control a buffer 134 configured to store audio data 111 from the AFE 121.

At a Step 23, the client software 130 may send the audio data 111 from the buffer 134 to the multi-assistant middleware 140, which may handle operations for providing the audio data 111 to a voice service corresponding to a virtual assistant selected to process the utterance. The multi-assistant middleware 140 may include software and/or logic configured to control the invocation of the virtual assistants and enforce rules to ensure proper receipt and transmission of user data. For example, the multi-assistant middleware 140 may control the creation of a dialog instance (e.g., a session) between a user and a virtual assistant. A dialog instance may be a singleton, meaning that the system 100 may only have a single instance active at a given time. In other words, a user may only be in contact with one virtual assistant at a time. Thus, data transferred between the user (e.g., the user's user device 110) and a first virtual assistant is inaccessible to other virtual assistants.

When the client software 130 receives the button signal (or other gesture), the client software 130 may begin receiving audio data 111 and storing it in the buffer 134. Upon determining a virtual assistant for handling the utterance, the client software 130 may send a request to the multi-assistant middleware 140 to initiate a dialog between the user and the determined virtual assistant. The multi-assistant middleware 140 may deny the request if there is an existing active dialog (e.g., another virtual assistant is listening or speaking via the user device 110). If the multi-assistant middleware 140 grants the request, it may provide a dialog identifier to the client software 130. The client software 130 may use the dialog identifier to cause the multi-assistant middleware 140 to allow transfer of audio data from the buffer 134 to the determined virtual assistant. Thus, in absence of the multi-assistant middleware 140 granting the dialog request and providing the dialog identifier, the client software 130 may be unable to transmit audio data to a virtual assistant (or anywhere else).

The functions of a virtual assistant may be accessed via an assistant voice service 155. The assistant 1 voice service 155*a* and the assistant 2 voice service 155*b* (collectively, "assistant voice services 155") may correspond to a first virtual assistant and a second virtual assistant, respectively. An assistant voice service 155 may represent language processing components, skill components, language output components, and/or associated components as described in further detail below with reference to FIGS. 5 and 6. In various implementations, the components represented by the assistant voice services 155 may reside on the user device 110 or the system component 120, or divided or shared between the two. In some implementations, the assistant 1 voice service 155*a* may correspond to one or more components of a first system component 120*a* and the assistant 2 voice service 155*b* may correspond to one or more components of a second system component 120*b*, etc. In some implementations, multiple assistant voice services 155 may correspond to a single system component 120, where configuration for each virtual assistant are stored in a multi-assistant component and used to process a user command and/or request using settings and/or resources corresponding to the determined virtual assistant.

The multi-assistant middleware 140 may, when a dialog request is granted, send audio data to the determined assistant voice service 155 via an assistant component 150*a*, 150*b*, 150*c*, etc. (collectively, "assistant components 150"). For example, at Step 24, the multi-assistant middleware 140 may send the audio data 111 to an assistant component 150 corresponding to the invoked assistant; for example, the assistant 1 component 150*a*. The assistant 1 component 150*a* may correspond to a primary or default virtual assistant for the user device 110. The multi-assistant middleware 140 may send and receive data to and from the assistant 1 voice service 155*a* via an assistant 1 component 150*a*. At a Step 25, the assistant 1 component may forward the audio data 111 to the voice service 155 corresponding to the invoked assistant; for example, the assistant 1 voice service 155*a*. At a Step 26, the assistant 1 voice service 155*a* may send the audio data 111, via the network 199, to a system component 120 for processing. In some implementations, certain speech processing operations may be performed on the user device 110 itself. In such cases, the data sent to the system component 120 may not be the audio data 111 but data representing the request to receive the awaiting notification(s). Further details regarding handling the request for awaiting notification(s) are discussed below with reference to FIG. 3. The system component 120 may return notification data to the user device 110. The notification data may include audio data for output (e.g., from the speaker 112), text and/or images to present from the display 116, etc. At a Step 27, the assistant 1 voice service 155*a* may forward the notification data to the assistant 1 component 150*a*. At a Step 28 the assistant 1 component 150*a* may forward the notification data to the multi-assistant middleware 140, which may, at a Step 29, forward the notification data to the client software 130. The client software 130 may, at a Step 30, present an output (e.g., synthesized speech, text, images, etc.) conveying part or all of the notification. For example, the client software 130 may receive a notification document from a notification publisher 380 (shown in FIG. 3 and described further below). The notification document may specify what to present on a display of the user device 110 such as an icon, headline, and/or body of the notification. The notification document may further describe active elements of the output such as a URL for a selectable element (e.g., a button) that a user may select to execute an operation. FIGS. 4A and 4B, described further below, illustrated example presentations of notifications on a display.

In some cases, the user may have another awaiting notification corresponding to a different virtual assistant for the device. If the user requests delivery of the notification, the user device 110 may perform operations similar to Steps 21 through 23 to, for example, receive input audio 11 from the user, generate audio data 111, and send the audio data 111 to the client software 130. The user device 110 may include an assistant 2 interface 145 corresponding to the other virtual assistant. The assistant interface 145 may translate data transferred between the multi-assistant middleware 140 and the assistant component 150. For example, the system 100 may include any number of assistant components 150 communicating with respective assistant voice services 155. In some cases, an assistant voice service 155 and assistant component 150 may be configured to interface with the multi-assistant middleware 140 directly by using a shared communication protocol, APIs, or other means of exchanging data. In some cases, however, the system 100 may include an assistant interface 145 to facilitate integration of, for example, assistant component and voice services corresponding to third-party virtual assistants developed with/for different communication protocols. Thus, when the user requests retrieval of a notification from the first virtual assistant, the request may be handled by the first assistant component 150*a* and the first assistant voice service 155*a*. Similarly, when the user requests retrieval of a notification from the second virtual assistant, the request may be handled by the second assistant interface 145, the second assistant component 150*b*, and the second assistant voice service 155*b*, and so on for a third virtual assistant, etc.

At a Step 31, the multi-assistant middleware 140 may send the audio data 111 to the assistant 2 interface 145. At a Step 32, the assistant 2 interface 145 may send the audio data 111 to the assistant 2 component 150*b*. At a Step 33, assistant 2 component 150*b* may send the audio data 111 to the assistant 2 voice service 155*b*. At a Step 34, the assistant 2 voice service 155*b* may send the audio data 111 (and/or other data representing the request for delivery of the awaiting notification) to the system component 120. In some implementations (e.g., as shown in FIG. 6), both assistant voice services 155 may send data to the same system component 120. In some implementations (e.g., as shown in FIG. 5), the assistant voice services 155 may send data to different system components 120. The system component 120 may return notification data to the user device 110. The notification data may include audio data for output (e.g., from the speaker 112), text and/or images to present from the display 116, etc. In some implementations, the notification data may include information regarding virtual assistant-specific characteristics (e.g., sounds, lights, etc.) to indicate to the user which virtual assistant the notification corresponds to. Additionally or alternatively, the notification data may include an indication of the virtual assistant, and the client software 130 (and/or other component(s) of the user device 110) may reproduce the virtual assistant-specific characteristics based on data stored in the user device 110. At a Step 35, the assistant 2 voice service 155*b* may forward the notification data to the assistant 2 component 150*b*. At a Step 36, the assistant 2 component 150*b* may forward the notification data to the assistant 2 interface 145. At a Step 37 the assistant 2 interface 145 may forward the notification data to the multi-assistant middleware 140, which may forward the notification data to the client software 130. The client software 130 may cause the user device 110 to present the notification data with output(s) consistent with the virtual assistant-specific characteristics. The Steps may be repeated for additional notifications and/or virtual assistants as illustrated, for example, in FIG. 2. It should be appreciated that in various implementations and/or use cases, the operations may include more, different, or fewer steps than what are described in FIG. 1B, and the operations may occur in different orders. For example, the user may first invoke the second virtual assistant (e.g., corresponding to the assistant 2 voice service 155*b*) and subsequently request notifications from the first virtual assistant (e.g., corresponding to the assistant 1 voice service 155*a*). In various implementations, the user device 110 may provide access to three or more virtual assistants.

FIG. 2 is a flowchart illustrating an example method 200 of providing notifications from multiple virtual assistants, according to embodiments of the present disclosure. The method 200 may be performed by, for example, one or more system components 120 receiving notifications from one or more assistant publisher systems' and delivering indicators and notifications to a user device 110. The method 200 is provided as an example and various implementations of the systems and methods may include more, fewer, and/or different steps.

The method 200 may begin by receiving (202) notification data from an assistant publisher system 115. The system component 120 may receive a single notification or a batch of notifications. The system component 120 may receive notifications from a single assistant publisher system 115 (e.g., corresponding to a single virtual assistant) or from multiple assistant publisher systems 115 (e.g., where a first assistant publisher system 115*a* corresponds to a first virtual assistant and a second assistant publisher system 115*b* corresponds to a second virtual assistant).

Using the components and operations described with respect to FIG. 1A, the system component(s) 120 may cause the user device 110 to present (204) an indicator of the awaiting notification(s). In some implementations, the system 100 may cause all user devices 110 associated with the destination user to present the indicator. In some implementations, the system 100 may only present the indicator on user devices 110 that have the wakeword of the source virtual assistant enabled. The indicator may include one or more of a visual or audible output. The type of indicator may depend on the type of user device 110 (e.g., whether or not it has a display). A user device with display 110*b* may display an icon, symbol, flag, dot, etc. on the display to indicate an awaiting notification. In some implementations, the user device 110 may present separate indicators to indicate notifications from separate virtual assistants. The user device 110 may present a light (e.g., one or more LEDs) such as a dot, light ring, glow, etc. to indicate an awaiting notification. The user device 110 may present different color lights or different light patterns (e.g., blinking) to indicate the source virtual assistant(s), the number of notifications, and/or the priority of a notification. In some implementations, the user device 110 may output synthesized speech (e.g., generated using a TTS component 580 described further below) to indicate the presence and/or source of the notification(s).

The method 200 may include receiving (206) a request for the awaiting notifications. The system component(s) 120 may handle the request using the components described with respect to FIG. 1A. The method 200 may include presenting (208) the notifications to the user. The system component(s) 120 may send notification data to the user device 110 and cause the device to present one or more outputs corresponding to the notifications. Further details regarding the operations for receiving the request and presenting the notifications are described below with reference to the signal flow diagram of FIG. 3.

The system 100 may present the notification(s) from the virtual assistant invoked by the user at the stage 206. The user may select the virtual assistant using the assistant's wakeword (e.g., "Alexa," "Mabelle," "Otto," etc.), by pressing a button that invokes a particular virtual assistant, using a gesture, (e.g., a non-verbal, non-contact movement such as a hand wave), and/or via a non-wakeword invocation in which the system 100 determines that the user's speech is directed to the system 100 and represents a request for an action that the system 100 is configured to perform.

After the system 100 presents the notification(s) corresponding to the invoked virtual assistant, the method 200 may include determining (210) whether there are more notifications available from other virtual assistants. If there are no more notifications ("no" at 210) the method 200 may include turning off (212) the notification indicator (e.g., darkening the light, ceasing a beep or tone, etc.). The system 100 may present synthesized speech indicating that there are no more notifications. At this point, the method 200 may end unless and/or until further notifications are received from the assistant publisher system(s) 115.

If notifications from other virtual assistants are available ("yes" at 210), the method 200 may include checking (214) the notifications corresponding to the next virtual assistant. The system 100 may select the next virtual assistant in various ways. For example, if there is a primary virtual assistant, but the user requested notifications corresponding to a secondary virtual assistant at the stage 206, the system 100 may select the primary virtual assistant next. If the user requested notifications corresponding to the primary virtual assistant at the stage 206, in various implementations, the system 100 may next select the virtual assistant having the most recent notification, the oldest notification, or the highest priority notification.

When the system 100 has selected the next virtual assistant, the method 200 may include checking (216) whether the virtual assistant has context sharing enabled. If the virtual assistant does not have context sharing enabled ("no" at 216), the system 100 may not present the notifications corresponding to that virtual assistant unless that virtual assistant is invoked directly. Thus, the method 200 may continue by determining (226) whether notifications from other virtual assistants remain. If notifications from other virtual assistants are available ("yes" at 216), the method 200 may include returning to the stage 214 and again checking for notifications corresponding to the next virtual assistant. If there are no more available notifications ("no" at 226), the method 200 may including leaving (228) the indicator on so the user knows the notification(s) are still available. The method 200 may end or suspend until the system 100 receives a user request to present the notification(s) (e.g., by returning to the stage 204).

If the next virtual assistant does have context sharing enabled ("yes" at 216), the method 200 may include prompting (218) the user to determine whether the user wishes to receive the other notifications. For example, if Mabelle was invoked first and the user has notifications available from Otto, the system 100 may present the handoff in the primary virtual assistant's voice (e.g., Alexa), "There are also notifications from Otto. Do you want to hear them?" If the user declines to hear the remaining notification(s) ("no" at 220), the method 200 may include leaving (228) the indicator on and ending or suspending operations unless and until receiving a user request to present the notification(s) (e.g., by returning to the stage 204).

If the user assents ("yes" at 220) to hear the remaining notification(s), the method 200 may include presenting (222) a handoff to inform the user that the notification(s) that follow are from a different virtual assistant. The handoff may be in the form of synthesized speech that includes the wakeword of the virtual assistant corresponding to the notification(s) that the system 100 will present next. For example, if Alexa was invoked first, the synthesized speech may be in Alexa's voice and say, "From Mabelle." The method 200 may include presenting (224) the notification(s). After presenting the notification(s), the method 200 may return to the stage 210 and determine whether more notifications remain.

The following dialogs illustrate example interactions between a user and the system 100. In the first example interaction, the user invokes the primary virtual assistant corresponding to the wakeword "Alexa." After the system 100 delivers notifications associated with Alexa, it prompts the user to listen to notifications from other assistants.

User: "Alexa, what are my notifications?"

Alexa: "From Amazon Shopping: cat litter will arrive today."

Alexa: "There are also notifications from Mabelle and Otto. Would you like to hear them?"

User: "Yes."

Alexa: "From Mabelle."

Mabelle: "Your monthly billing statement is available. Please refer to the Mabelle app to view and pay."

Alexa: "From Otto."

Otto: "Your car is due for a scheduled service. Please download the Otto app for details."

[Notification Indicator Turns Off.]

In the second example, the user has available notifications from Alexa, Mabelle, and Otto. In this case, however, the virtual assistant associated with the wakeword Otto does not have context sharing enabled. Thus, Alexa cannot provide those notifications. Alexa delivers Mabelle's notification but not Otto's; however, because there are still available notifications at the end of the interaction, the notification indicator remains illuminated.

User: "Alexa, what are my notifications?"

Alexa: "From Amazon Shopping: cat litter will arrive today."

Alexa: "There is also a notification from Mabelle. Would you like to hear it?"

User: "Yes."

Alexa: "From Mabelle."

Mabelle: "Your monthly billing statement is available. Please refer to the Mabelle app to view and pay."

[Notification Indicator Remains Illuminated.]

The user may begin a new interaction with Otto to check the remaining notification.

User: "Otto, what are my notifications?"

Otto: "Your car is due for a scheduled service. Please download the Otto app for details."

[Notification Indicator Turns Off.]

In the third example, the user invokes Mabelle first. The user has available notifications from Alexa, Mabelle, and Otto. The system 100 provides Mabelle's notifications first, followed by Alexa, which is the primary virtual assistant for the system 100. (In some implementations, the user may configure the system 100 to make a different virtual assistant the primary assistant.) After providing the notifications for the requested assistant and the primary assistant, the system 100 may provide the remaining notifications in order of when the notification was received and/or priority.

User: "Mabelle, what are my notifications?"

Mabelle: "Your monthly billing statement is available. Please refer to the Mabelle app to view and pay."

Alexa: "There are also notifications from Otto and me, Alexa. Would you like to hear them?"

User: "Yes."

Alexa: "From Amazon Shopping: cat litter will arrive today."

Alexa: "From Otto."

Otto: "Your car is due for a scheduled service. Please download the Otto app for details."

[Notification Indicator Turns Off.]

The fourth example is similar to the third, but Mabelle injects a handoff (underlined) before Alexa outputs the prompt.

User: "Mabelle, what are my notifications?"

Mabelle: "Your monthly billing statement is available. Please refer to the Mabelle app to view and pay."

Mabelle: "Alexa."

Alexa: "There are also notifications from Otto and me, Alexa. Would you like to hear them?"

. . .

FIG. 3 is a signal flow diagram illustrating example operations of the multi-assistant notification system 100 providing notifications from multiple virtual assistants, according to embodiments of the present disclosure. The flow diagram illustrates data transmitted between the user device 110, orchestrator component 530, notification skill component 190, notification component 170, profile storage 570, notification publisher component 380, and speech synthesis component 580. The profile storage 570 and speech synthesis component 580 are discussed in further detail below with reference to FIGS. 5 and 6.

The notification publisher component 380 may include hardware and/or software configured to generate a document that specifies how a notification may be presented by the user device 110. The notification document may specify the layout of text, images, and/or interactive elements (e.g., selectable buttons) to be presented from a user device 110 with a display. The notification document may also include uniform resource locators (URLs) that the user device 110 may use to retrieve audio data representing synthesized speech. The notification document may also include URLs for the buttons, links, and/or other features to be presented on the display. FIGS. 4A and 4B, described further below, illustrated example presentations of notifications on a display. In some implementations, the notification publisher component 380 may be a part of the notification skill component 190. In some implementations, the notification publisher component 380 may be a multi-purpose publishing component that can generate documents for other skills in addition to the notification skill.

The operations may begin when a user inputs a request for delivery of notifications. The user may input the request in response to seeing and/or hearing a notification indicator presented by the user device 110. The user device 110 may receive the input and send (302) the request to the orchestrator component 530. In various implementations, the orchestrator component 530 may reside in the user device 110 and/or a system component 120; in any case, operation of the orchestration component 530 may be the same. The orchestrator component 530 may initialize (304) a task context token (TCT). The TCT is data such as an identifier that represents the active virtual assistant for the current interaction and indicates the active virtual assistant to system components supporting the current interaction. In certain configurations such a token may be controlled by the orchestrator component 530 which may require operations by the orchestrator component 530 to invoke components of one virtual assistant once a session has been started for another virtual assistant, but in other configurations other components (such as the notification component 170) may be configured modify and/or create updated tokens to allow switching between virtual assistants/personalities for purposes of determining and outputting notification data. In some implementations, the notification component 170 may request a new or updated token from the orchestrator component 530 to, for example, deliver a notification from a second virtual assistant after delivering a notification from a first virtual assistant. The orchestrator component 530 may call (306) the notification skill component 190, which may begin retrieving (308) the notification(s). The notification skill component 190 may get (310) the notification(s) from the notification component 170, which may itself retrieve the notification(s) from the notification DB 177. The notification skill component 190 may also get (312) user preferences from the profile storage component 570. The user preferences may indicate, for example, whether the system 100 should deliver only notifications associated with the virtual assistant invoked, or whether the system 100 should deliver (or offer to deliver) any awaiting notifications from other virtual assistants. In some implementations, the user preferences may indicate which virtual assistants are enabled for one or more user devices 110 associated with the intended recipient of the notification (e.g., which virtual assistant wakewords have been enabled for the user device 110). The notification skill component 190 may begin (314) a notification delivery session using the list of assistants retrieved from the profile storage component 570. In some implementations, the user preferences may indicate a device type of the user device 110 (e.g., whether or not the user device 110 has a display 116). The device type may determine how the notification delivery is rendered by the notification publisher component 380.

The notification skill may call on the notification publisher component 380 to render (316) the notification. To apply the appropriate voice characteristics and/or visual characteristics to the notification delivery, the notification publisher component may get (318) the TCT from the orchestrator component 530. This TCT may indicate a first virtual assistant corresponding to first voice/visual characteristics. The notification publisher component 380 will use the virtual assistant indicated by the TCT to select the visual and/or voice characteristics to apply to delivery of the notification. The notification publisher component 380 may call on the speech synthesis component 580 to generate (320) synthesized speech representing part or all of the notification. For example, the notification publisher component 380 may render a notification delivery for a multi-modal device such that a notification headline or summary is output as synthesized speech while the body of the notification (and possibly the headline/summary as well) are output as visual content on the display 116. For a user device 110 without a display, the notification publisher component 380 may render the entire notification as synthesized speech. The notification publisher component 380 may render the notification delivery with other information including a light color and/or pattern for the user device 110 to present during presentation of the notification to indicate the source virtual assistant.

The notification publisher component 380 may generate a notification document that includes representations of the rendered components of the notification delivery including synthesized speech, content for visual presentation, and/or active elements of the visual presentation such as selectable buttons, hyperlinks, etc. The notification document may specify, for example, how notification content should be presented on the display 116, including visual characteristics used to distinguish different virtual assistants from one another. FIGS. 4A and 4B below show examples of different presentations of notifications on a display 116. The notification publisher component 380 may send (322) the notification documents to the user device 110 for presentation to the user. The notification document may specify what to present on a display of the user device 110 such as an icon, headline, and/or body of the notification. The notification document may further describe active elements of the output such as a URL for a selectable element (e.g., a button) that a user may select to execute an operation. The client software 130 of the user device 110 may present the text, images, and/or audio specified by the notification document. FIGS. 4A and 4B, described further below, illustrated example presentations of notifications on a display.

When the user device 110 has finished presenting the output (e.g., the synthesized speech and the visual output), the user device 110 may send (324) the notification skill component 190 an indication that it has completed delivering the notification represented in the notification document. The user device 110 may return the indication after presenting the synthesized and/or content on the display. The user device 110 may return the indication after an affirmative act by the user such as the user ending the voice interaction, dismissing the notification (e.g., by voice or touch input), closing a window or tab associated with the notification, etc.

Upon receiving the indication of completed delivery, the notification skill component 190 may fetch (326) the session and determine that more notifications are available for delivery to the user device 110. The notification skill component 190 may call (328) on the speech synthesis component 580 to render a prompt asking whether the user would like to receive other available notification. The speech synthesis component 580 may request and receive (330) the TCT from the orchestration component 530 (which may be an updated/new TCT) and render the prompt using the voice characteristics corresponding to the active virtual assistant. The speech synthesis component 580 may then generate the speech and send (332) the synthesized speech to the user device 110. The user device 110 may return (334) the user response, which may represent an assent to hear the additional notification(s). The orchestrator component 530 may call (336) the notification skill component 190 to deliver the next notification. The notification skill component 190 may retrieve (338) notification data from the notification component 170. The notification skill component 190 may update (340) to, for example, indicate that the user is interacting with a different virtual assistant. In some implementations, the notification skill component 190 may request rendering of a handoff and/or generation of a new TCT by the orchestrator component.

The notification skill component 190 may call (342) on the notification publisher component 380 to render the next notification. The notification skill component 190 may determine that one or more remaining notifications may correspond to a different virtual assistant from the earlier notification. Accordingly, to apply the appropriate voice characteristics and/or visual characteristics to the next notification delivery, the notification publisher component may request and receive (344) the new and/or updated TCT, representing the new active virtual assistant, from the orchestrator component 530. The request for the new TCT (and/or determining an updated TCT by the notification skill component 190) may be performed in response to the virtual assistant for the further notification(s) being different from the virtual assistant for the previous notification(s). The notification publisher component 380 may call (346) on the speech synthesis component 580 to generate (346) speech. The notification publisher component 380 may then generate and send (348) a new notification document to the user device 110. The user device 110 may indicate that presentation of the notification is complete by returning (350) an indication of finishing the notification document. In cases, the operations may continue by repeating the stages 326 to 350 for additional notifications.

FIGS. 4A and 4B are conceptual diagrams illustrating an example graphical user interface (GUI) providing notifications from multiple virtual assistants, according to embodiments of the present disclosure. Elements of the GUI may be described in a notification document generated by the notification publisher 380 and presented on a display of a user device 110 by the client software 130. The GUI may be presented on a display 116 of a user device 110. The display 116 may be, for example, a computer monitor, smart phone touchscreen, or the like. The GUI may present a first rendering 400*a* and a second rendering 400*b* (collectively "renderings 400"). The renderings 400 may include icons 410 corresponding to different virtual assistant enabled for the user device 110. The renderings 400 may include one or more current notifications 420 and one or more previously read notifications 440. The renderings 400 may also include a box 430 separating current notifications 420 and previous notifications 440. The box 430 may include a selectable element such as a button that allows a user to dismiss all current notifications (e.g., and thus move them to the previously read section).

The renderings 400 may include various indicators corresponding to the active virtual assistant to allow the user to determine quickly and easily which virtual assistant the notifications 420 and 440 correspond to. For example, the first rendering 400*a* may include an indicator 415*a* over the icon 410*a* corresponding to the active virtual assistant, in this case Alexa as denoted by an "A1" inside a circle. In contrast, the second rendering 400*b* may include an indicator 415*b* over the icon 410*b* corresponding to the active virtual assistant Mabelle, as denoted by an "A3" inside a circle. The indicator 415 may also include highlighting, bolding, brightening, flashing, and/or other effect on the icon 410 corresponding to the active virtual assistant. The icons 410 and/or indicators 415, and effects used thereon, may also be used to indicate the availability of notifications from that virtual assistant.

The renderings 400 may include visual characteristics corresponding to the active virtual assistant. For example, the first rendering 400*a* has a first background 405*a* corresponding to the first virtual assistant, and the second rendering 400*b* has a second background 405*b* corresponding to the second virtual assistant. The backgrounds 405 may differ in color, pattern, and/or brightness. In some implementations, one or more of the backgrounds 405 may include an image that may differ from the background 405 corresponding to other virtual assistants.

The distinct visual characteristics may extend to borders, edges, corners, and/or other geometric features of the renderings 400. For example, in the first rendering 400*a* the boxes 420*a*, 430*a*, and 440*a* have sharp corners, while in the second rendering 400*b* the boxes 420*b*, 430*b*, and 440*b* have rounded corners. In various implementations, the border of the boxes 420, 430, and/or 440 may differ in width, color, pattern, and/or effect (e.g., shadowing, softness, etc.). Thus, the user may be able to intuitively tell which virtual assistant corresponds to the notification they are reading.

The notification 420 may include various information. For example, the notification 420*a* includes an icon corresponding to the source virtual assistant as well as information related to the recipient (e.g., user and/or user device 110), the domain or topic, and the age of the notification (e.g., time elapsed since the system 100 received the notification data from the virtual assistant publisher system 115). In some cases, the notification 420 may include an additional icon and/or image. In some cases, the notification 420 may include one or more selectable elements; for example, a "button" the user may select via a touchscreen or select with a mouse or keystroke input on a non-touchscreen monitor. A selectable element may activate a URL such a hyperlink to open an app corresponding to the notification and/or to navigate a browser of the user device 110 to a particular website. A selectable element may dismiss the notification or "snooze" it for a period of time. A snoozed notification may, after the period has elapsed, cause the indication of available notification to reappear and the snoozed notification to return to the top of the new notification portion of the rendering 400. Current notifications 420 and/or previously read notifications 440 may be deleted using, for example, a selectable element and/or other gestures such as swiping.

The user device 110 may present the renderings 400 during presentation of synthesized speech corresponding to the notification 420 currently presented. In some cases, the synthesized speech may represent a headline or summary of the notification while the notification 420 displayed in the rendering 400 represents the body of the notification. In some cases, the synthesized speech may represent the body of the notification while the rendering 400 displays the headline/summary. In some cases, dismissing a notification 420 via a selectable element on the display 116 may halt output of the synthesized speech corresponding to that notification.

FIG. 5 is a conceptual diagram illustrating components that may be included in a first example implementation of the multi-assistant notification system 100, according to embodiments of the present disclosure. In the implementation of the system 100 shown in FIG. 5, components corresponding to a first virtual assistant (e.g., the assistant 1 voice service 155*a*) may be divided and/or shared between the user device 110 and a first system component 120*a*, components corresponding to a second virtual assistant may be divided and/or shared between the user device 110 and a second system component 120*b*, etc. The respective system components 120 may be separate and distinct from each other. Data from the user device 110 corresponding to a first virtual assistant (e.g., an utterance to be handled by the first virtual assistant) may be sent to the first system component 120*a*, and data from the device corresponding to a second virtual assistant may be sent to the second system component 120*b*, etc.

The system 100 may operate using various components as described in FIG. 5. The various components may be located on same or different physical devices. Communication between various components may occur directly or across a network(s) 199. The user device 110 may include audio capture component(s), such as a microphone or array of microphones of a user device 110, captures audio 11 and creates corresponding audio data 111. Once speech is detected in audio data 111 representing the audio 11, the user device 110 may determine if the speech is directed at the user device 110/system component 120. In at least some embodiments, such determination may be made using a wakeword detection component 122. The wakeword detection component 122 may be configured to detect various wakewords. In at least some examples, each wakeword may correspond to a name of a different virtual assistant. An example wakeword/virtual assistant name is "Alexa." In another example, input to the system may be in form of text data, for example as a result of a user typing an input into a user interface of user device 110. Other input forms may include indication that the user has pressed a physical or virtual button on user device 110, the user has made a gesture, etc.

Following detection of a wakeword, button press, or other indication to begin receiving input, the user device 110 may "wake" and begin generating and processing audio data 111 representing the audio 11. The audio data 111 may include data corresponding to the wakeword; in other embodiments, the portion of the audio corresponding to the wakeword may be removed prior to downstream processing of the audio data 111 (e.g., ASR and/or NLU). In the case of touch input detection or gesture-based input detection, the audio data may not include a wakeword.

Upon receipt by the system 100, the audio data 111 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 111 to a language processing components 592. The language processing components 592 (sometimes also referred to as a spoken language understanding (SLU) component) includes an automatic speech recognition (ASR) component 550 and a natural language understanding (NLU) component 560. The ASR component 550 may transcribe the audio data 111 into text data. The ASR component 550 may receive the audio data 111 in a streaming fashion; that is, the ASR component 550 may begin receiving and/or processing the audio data 111 as it is generated by the system 100 and without necessarily waiting for the user to stop speaking, release the button 113, or otherwise indicate an end of speech. The text data output by the ASR component 550 represents one or more than one (e.g., in the form of an N-best list) ASR hypotheses representing speech represented in the audio data 111. The ASR component 550 interprets the speech in the audio data 111 based on a similarity between the audio data 111 and pre-established language models. For example, the ASR component 550 may compare the audio data 111 with models for sounds (e.g., acoustic units such as phonemes, senons, phones, etc.) and sequences of sounds to identify words that match the sequence of sounds of the speech represented in the audio data 111. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in greater detail below with regard to FIG. 7.

The language processing components 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the user device 110, the system component(s) 120, a skill component 590, a skill system component(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "$5^{th}$ Symphony" as the piece of music to be played. For further example, if the text data corresponds to "what is the weather," the NLU component 560 may determine an intent that the system output weather information associated with a geographic location of the user device 110. In another example, if the text data corresponds to "turn off the lights," the NLU component 560 may determine an intent that the system turn off lights associated with the user device 110 or the user 5. However, if the NLU component 560 is unable to resolve the entity—for example, because the entity is referred to by anaphora such as "this song" or "my next appointment"—the language processing components 592 may send a decode request to another speech processing system for information regarding the entity mention and/or other context related to the utterance. The language processing components 592 may augment, correct, or base results data upon the audio data 111 as well as any data received from the other speech processing system.

The NLU component 560 may return NLU results data 985/925 (which may include tagged text data, indicators of intent, etc.) back to the orchestrator component 530. The orchestrator component 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 985/925 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The NLU component 560, post-NLU ranker 565 and other components are described in greater detail below with regard to FIGS. 8 and 9.

A skill component may be software running on the system component(s) 120 that is akin to a software application. That is, a skill component 590 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 590. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 590 may operate in conjunction between the system component(s) 120 and other devices, such as the user device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system component(s) 525 may communicate with a skill component(s) 590 within the system component(s) 120 and/or directly with the orchestrator component 530 or with other components. A skill support system component(s) 525 may be configured to perform one or more actions. An ability to perform such action(s) may sometimes be referred to as a "skill." That is, a skill may enable a skill support system component(s) 525 to execute specific functionality in order to provide data or perform some other action requested by a user. For example, a weather service skill may enable a skill support system component(s) 525 to provide weather information to the system component(s) 120, a car service skill may enable a skill support system component(s) 525 to book a trip with respect to a taxi or ride sharing service, an order pizza skill may enable a skill support system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 590 dedicated to interacting with the skill support system component(s) 525. Unless expressly stated otherwise, reference to a skill, skill device, or skill component may include a skill component 590 operated by the system component(s) 120 and/or skill operated by the skill support system component(s) 525. Moreover, the functionality described herein as a skill or skill may be referred to using many different terms, such as an action, bot, app, or the like. The skill component 590 and or skill support system component(s) 525 may return output data to the orchestrator component 530.

The system component 120 includes a language output components 593. The language output components 593 includes a natural language generation (NLG) component 579 and a text-to-speech (TTS) component 580. The NLG component 579 can generate text for purposes of TTS output to a user. For example, the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data 1010 discussed below). Alternatively or in addition, the TTS component 580 may receive text data from a skill component 590 or other system component for output.

The NLG component 579 may include a trained model. The NLG component 579 generates text data 1010 from dialog data received (e.g., by a dialog manager) such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The system 100 (either on user device 110, system component 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component 120 with permission to allow the skill to execute with respect to the user's natural language user inputs. If a user does not enable a skill, the system component 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 6 is a conceptual diagram illustrating components that may be included in a second example implementation of the multi-assistant notification system 100, according to embodiments of the present disclosure. In the implementation of the system 100 shown in FIG. 6, components corresponding to multiple virtual assistant may be divided and/or shared between the user device 110 and the system component 120. Processing of data by components of the system component 120 may be performed according to a determined virtual assistant using configuration data maintained by the multi-assistant component 615. For example, data received by the system component 120 for processing may include an assistant identifier or other metadata that the components of the system component 120 may use to process the data in a manner consistent with the determined virtual assistant. Thus, the system component 120 may perform language processing using models, entity libraries, etc. corresponding to the determined virtual assistant, and may generate synthesized speech using voice parameters corresponding to the determined virtual assistant, etc.

In some implementations, the system component 120 may have and/or interface with skill components dedicated to a particular virtual assistant. For example, the user device 110 and/or system component 120 may include first assistant skill components 690, which may include skill components 590 as previously described. The user device 110 and/or system component 120 may further include second assistant skills 691 including skill components 690*a*, 690*b*, and 690*c*

(collectively, "skill components 690"). In some implementations, the skill components 690 may be the same as or similar to the skill components 590. In some implementations, the first assistant skill components 690 may provide different functionality than the second assistant skills. In some implementations, the first assistant skill components 690 may be general-purpose skills (e.g., shopping, weather, music, etc.) not specific to a particular domain or device, while the second assistant skills 691 may be specialized to a certain domain, device, service, etc., such as for controlling operations of the smart TV 110*g*. Some of the skill components 590 may interface with one or more skill support system components 525; similarly, some of the skill components 690 may interface with one or more skill support system components 625. In some implementations, the system 100 may have other skills and/or skill components that are common to more than one virtual assistant.

Other components of the system 100 illustrated in FIG. 6, such as the language processing components 592, language output components 593, profile storage 570, and/or orchestrator component 530 may be the same as or similar to the corresponding components as described with respect to FIG. 5.

Figure 7:
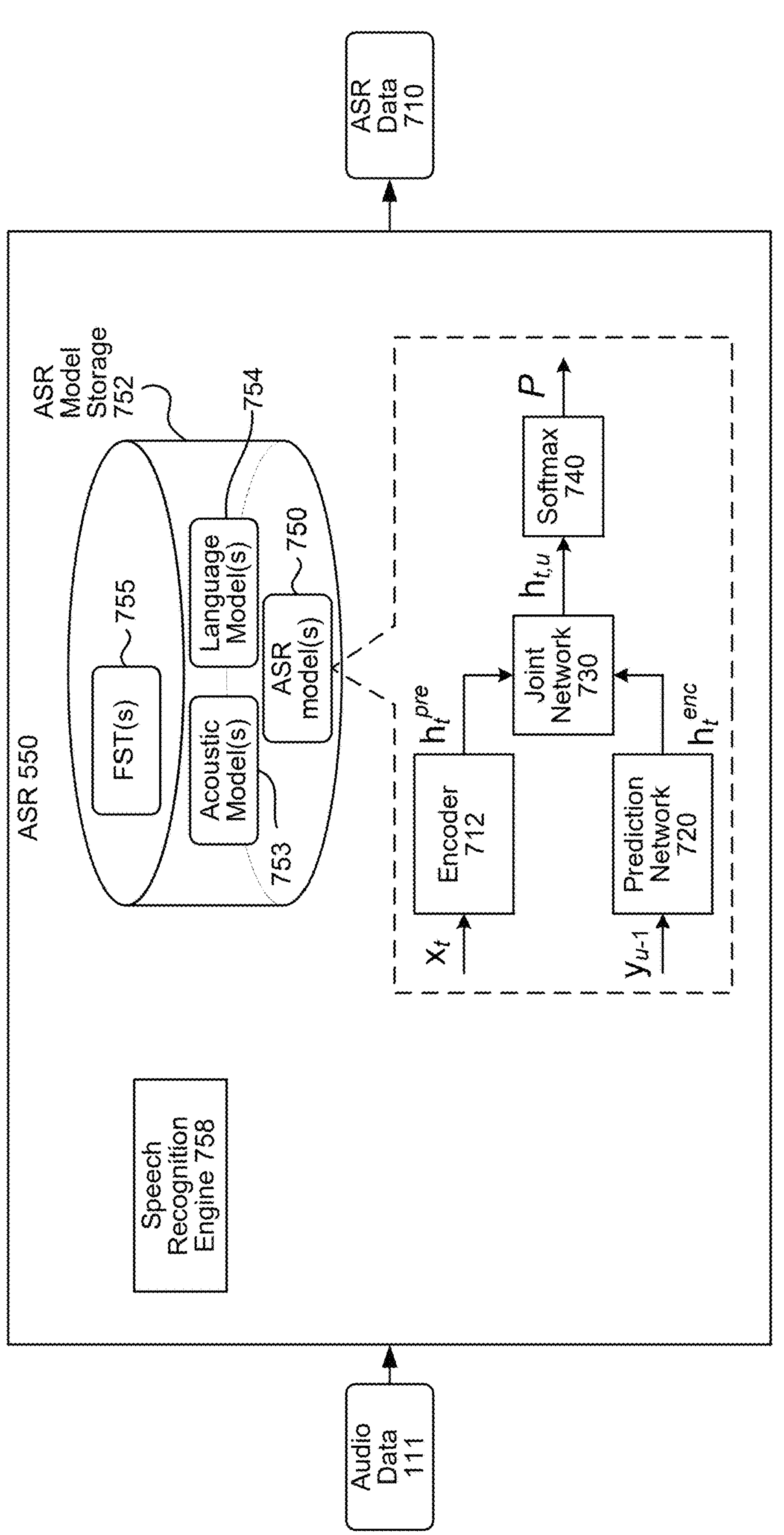
FIG. 7 is a conceptual diagram of an ASR component, according to embodiments of the present disclosure.

FIG. 7 is a conceptual diagram of an ASR component 550, according to embodiments of the present disclosure. The ASR component 550 may interpret a spoken natural language input based on the similarity between the spoken natural language input and pre-established language models 754 stored in an ASR model storage 752. For example, the ASR component 550 may compare the audio data with models for sounds (e.g., subword units or phonemes) and sequences of sounds to identify words that match the sequence of sounds spoken in the natural language input. Alternatively, the ASR component 550 may use a finite state transducer (FST) 755 to implement the language model functions.

When the ASR component 550 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may include a speech recognition engine 758. The ASR component 550 receives audio data 111 (for example, received from a local device 110 having processed audio detected by a microphone by an acoustic front end (AFE) or other component). The speech recognition engine 758 compares the audio data 111 with acoustic models 753, language models 754, FST(s) 755, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 758 and/or prior to processing by the speech recognition engine 758.

In some implementations, the ASR component 550 may process the audio data 111 using the ASR model 750. The ASR model 750 may be, for example, a recurrent neural network such as an RNN-T. An example RNN-T architecture is illustrated in FIG. 7. The ASR model 750 may predict a probability (y|x) of labels $y=(y_1, \ldots, y_u)$ given acoustic features $x=(x_1, \ldots, x_t)$. During inference, the ASR model 750 can generate an N-best list using, for example, a beam search decoding algorithm. The ASR model 750 may include an encoder 712, a prediction network 720, a joint network 730, and a softmax 740. The encoder 712 may be similar or analogous to an acoustic model (e.g., similar to the acoustic model 753 described below), and may process a sequence of acoustic input features to generate encoded hidden representations. The prediction network 720 may be similar or analogous to a language model (e.g., similar to the language model 754 described below), and may process the previous output label predictions, and map them to corresponding hidden representations. The joint network 730 may be, for example, a feed forward neural network (NN) that may process hidden representations from both the encoder 712 and prediction network 720, and predict output label probabilities. The softmax 740 may be a function implemented (e.g., as a layer of the joint network 730) to normalize the predicted output probabilities.

The speech recognition engine 758 may process the audio data 111 with reference to information stored in the ASR model storage 752. Feature vectors of the audio data 111 may arrive at the system component(s) encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 111 may be processed by one or more acoustic model(s) 753 to determine acoustic unit data. The acoustic unit data may include indicators of acoustic units detected in the audio data 111 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 560) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
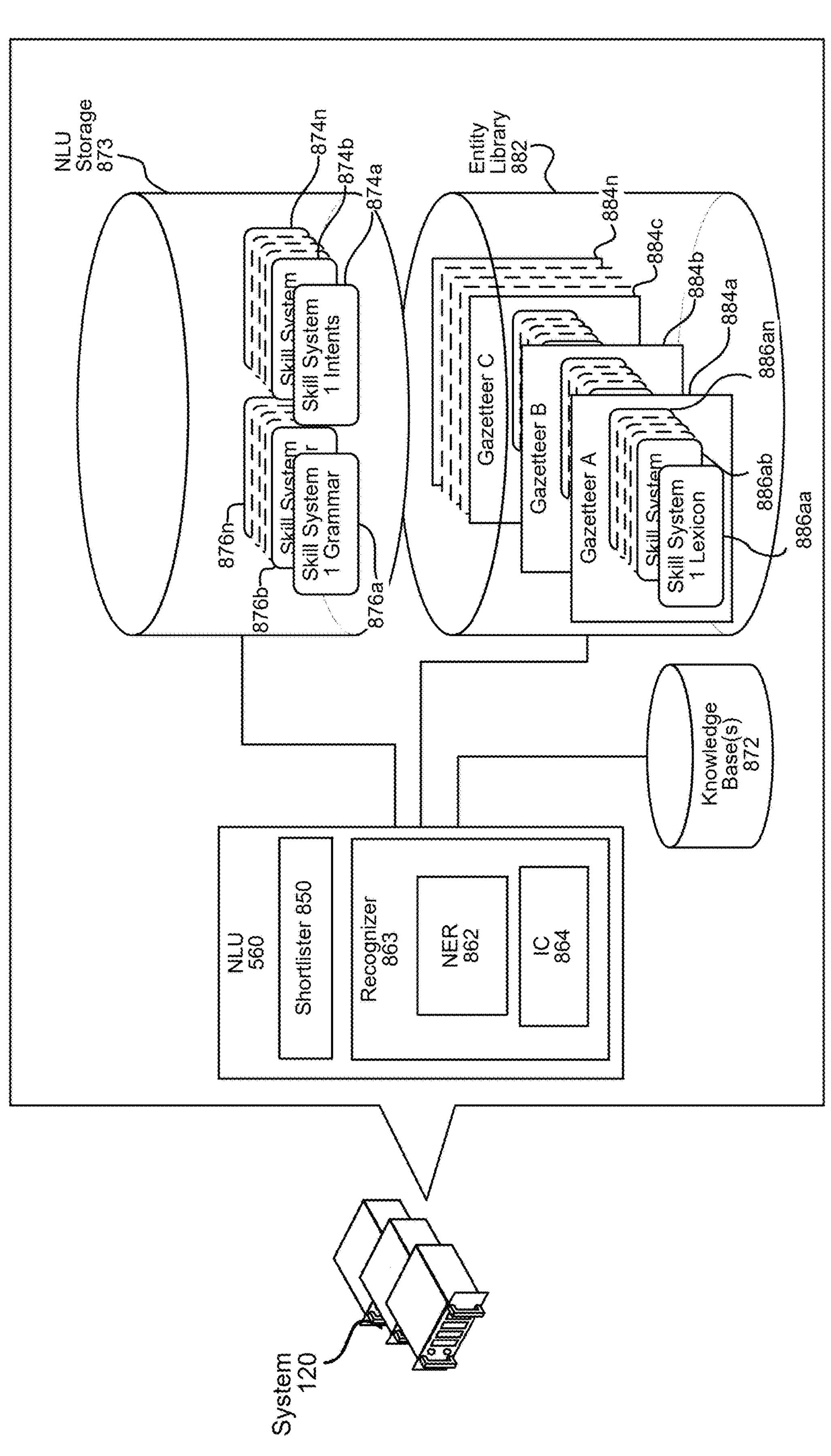
FIG. 8 is a conceptual diagram of how natural language processing is performed, according to embodiments of the present disclosure.

FIGS. 8 and 9 illustrates how the NLU component 560 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 850. The shortlister component 850 selects skills that may execute with respect to ASR output data 710 input to the NLU component 560 (e.g., applications that may execute with respect to the user input). The ASR output data 710 (which may also be referred to as ASR output data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 560 may process ASR output data 710 input thereto with respect to every skill of the system, either in parallel, in series, or using some combination thereof. By implementing a shortlister component 850, the NLU component 560 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system component(s) 120. For example, during a training period skill system component(s) 525 associated with a skill may provide the system component(s) 120 with training text data representing sample user inputs that may be provided by a user to invoke the skill. For example, for a ride sharing skill, a skill system component(s) 525 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system component(s) 120 may solicit the skill system component(s) 525 associated with the skill regarding whether the determined other user input structures are permissible, from the perspective of the skill system component(s) 525, to be used to invoke the skill. The alternate user input structures may be derived by one or more trained models during model training and/or may be based on user input structures provided by different skills. The skill system component(s) 525 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system component(s) 120 may use the sample user inputs provided by a skill system component(s) 525, and related sample user inputs potentially determined during training, as binary examples to train a model associated with a skill associated with the skill system component(s) 525. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 560 may include one or more recognizers 863. In at least some embodiments, a recognizer 863 may be associated with a skill system component 525 (e.g., the recognizer may be configured to interpret text data to correspond to the skill system component 525). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 560) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or user device 110. For example, a Gazetteer A (884*a*) includes skill-indexed lexical information 886*aa* to 886*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the user device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (884*a*-884*n*) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 550 or output from the user device 110 (as illustrated in FIG. 9). The ASR component 550 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the user device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 550. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the user device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-Best List Data 915 Including Confidence Scores that May be Output by the Shortlister Component 850 May be Represented as, for Example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 920 may include an indicator of the user associated with the ASR output data 710.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the user device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 850 receives the ASR output data 710, the shortlister component 850 may determine whether profile data associated with the user and/or user device 110 that originated the command includes an indication of enabled skills.

The other data 920 may also include data indicating the type of the user device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the user device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively, the shortlister component 850 may run a model configured to determine a score for each domain. The shortlister component 850 may determine a same confidence score for each of the domains in the first instance. The shortlister component 850 may then alter the original confidence scores based on the type of the user device 110 that originated the user input corresponding to the ASR output data 710. For example, if the user device 110 is a displayless device, the shortlister component 850 may increase the confidence score associated with the domain that generates audio data while leaving the confidence score associated with the domain that generates video data the same. Alternatively, if the user device 110 is a displayless device, the shortlister component 850 may leave the confidence score associated with the domain that generates audio data the same while decreasing the confidence score associated with the domain that generates video data. Moreover, if the user device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system component(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 530) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 530 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 530 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 560 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 560 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 560 may include multiple entity resolution components 970 and each entity resolution component 970 may be specific to one or more domains.

The NLU component 560 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of user device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system component(s) 120 (e.g., designated 590 in FIG. 5). The NLU component 560 may separately perform NLU processing described above with respect to domains associated with skills that are at least partially implemented as part of the skill system component(s) 525. In an example, the shortlister component 850 may only process with respect to these latter domains. Results of these two NLU processing paths may be merged into NLU output data 985, which may be sent to a post-NLU ranker 565, which may be implemented by the system component(s) 120.

The post-NLU ranker 565 may include a statistical component that produces a ranked list of intent/skill pairs with associated confidence scores. Each confidence score may indicate an adequacy of the skill's execution of the intent with respect to NLU results data associated with the skill. The post-NLU ranker 565 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 565. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 565 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 565 (or other scheduling component such as orchestrator component 530) may solicit the first skill and the second skill to provide potential result data 930 based on the first NLU hypothesis and the second NLU hypothesis, respectively. For example, the post-NLU ranker 565 may send the first NLU hypothesis to the first skill component **590*a* along with a request for the first skill component 590*a* to at least partially execute with respect to the first NLU hypothesis. The post-NLU ranker 565 may also send the second NLU hypothesis to the second skill component 590*b* along with a request for the second skill component 590*b* to at least partially execute with respect to the second NLU hypothesis. The post-NLU ranker 565 receives, from the first skill component 590*a*, first result data 930*a* generated from the first skill component 590*a*'s execution with respect to the first NLU hypothesis. The post-NLU ranker 565 also receives, from the second skill component 590*b*, second results data 930*b* generated from the second skill component 590*b***'s execution with respect to the second NLU hypothesis.

The result data 930 may include various portions. For example, the result data 930 may include content (e.g., audio data, text data, and/or video data) to be output to a user. The result data 930 may also include a unique identifier used by the system component(s) 120 and/or the skill system component(s) 525 to locate the data to be output to a user. The result data 930 may also include an instruction. For example, if the user input corresponds to "turn on the light," the result data 930 may include an instruction causing the system to turn on a light associated with a profile of the device (**110*a*/110*b***) and/or user.

The post-NLU ranker 565 may consider the first result data **930*a* and the second result data 930*b* to alter the first confidence score and the second confidence score of the first NLU hypothesis and the second NLU hypothesis, respectively. That is, the post-NLU ranker 565 may generate a third confidence score based on the first result data 930*a* and the first confidence score. The third confidence score may correspond to how likely the post-NLU ranker 565 determines the first skill will correctly respond to the user input. The post-NLU ranker 565 may also generate a fourth confidence score based on the second result data 930*b* and the second confidence score. One skilled in the art will appreciate that a first difference between the third confidence score and the fourth confidence score may be greater than a second difference between the first confidence score and the second confidence score. The post-NLU ranker 565 may also consider the other data 920 to generate the third confidence score and the fourth confidence score. While it has been described that the post-NLU ranker 565 may alter the confidence scores associated with first and second NLU hypotheses, one skilled in the art will appreciate that the post-NLU ranker 565 may alter the confidence scores of more than two NLU hypotheses. The post-NLU ranker 565 may select the result data 930 associated with the skill component 590 with the highest altered confidence score to be the data output in response to the current user input. The post-NLU ranker 565 may also consider the ASR output data 710** to alter the NLU hypotheses confidence scores.

The orchestrator component 530 may, prior to sending the NLU results data 985 to the post-NLU ranker 565, associate intents in the NLU hypotheses with skill components 590. For example, if a NLU hypothesis includes a <PlayMusic> intent, the orchestrator component 530 may associate the NLU hypothesis with one or more skill components 590 that can execute the <PlayMusic> intent. Thus, the orchestrator component 530 may send the NLU results data 985, including NLU hypotheses paired with skill components 590, to the post-NLU ranker 565. In response to ASR output data 710 corresponding to "what should I do for dinner today," the orchestrator component 530 may generates pairs of skill components 590 with associated NLU hypotheses corresponding to:

Skill 1/NLU hypothesis including <Help> intent

Skill 2/NLU hypothesis including <Order> intent

Skill 3/NLU hypothesis including <DishType> intent

The post-NLU ranker 565 queries each skill component 590, paired with a NLU hypothesis in the NLU output data 985, to provide result data 930 based on the NLU hypothesis with which it is associated. That is, with respect to each skill, the post-NLU ranker 565 colloquially asks the skill "if given this NLU hypothesis, what would you do with it." According to the above example, the post-NLU ranker 565 may send skill components 590 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 565 may query each of the skill components 590 in parallel or substantially in parallel.

A skill component 590 may provide the post-NLU ranker 565 with various data and indications in response to the post-NLU ranker 565 soliciting the skill component 590 for result data 930. A skill component 590 may simply provide the post-NLU ranker 565 with an indication of whether or not the skill can execute with respect to the NLU hypothesis it received. A skill component 590 may also or alternatively provide the post-NLU ranker 565 with output data generated based on the NLU hypothesis it received. In some situations, a skill component 590 may need further information in addition to what is represented in the received NLU hypothesis to provide output data responsive to the user input. In these situations, the skill component 590 may provide the post-NLU ranker 565 with result data 930 indicating slots of a framework that the skill component 590 further needs filled or entities that the skill component 590 further needs resolved prior to the skill component 590 being able to provide result data 930 responsive to the user input. The skill component 590 may also provide the post-NLU ranker 565 with an instruction and/or computer-generated speech indicating how the skill component 590 recommends the system solicit further information needed by the skill component 590. The skill component 590 may further provide the post-NLU ranker 565 with an indication of whether the skill component 590 will have all needed information after the user provides additional information a single time, or whether the skill component 590 will need the user to provide various kinds of additional information prior to the skill component 590 having all needed information. According to the above example, skill components 590 may provide the post-NLU ranker 565 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 930 includes an indication provided by a skill component 590 indicating whether or not the skill component 590 can execute with respect to a NLU hypothesis; data generated by a skill component 590 based on a NLU hypothesis; as well as an indication provided by a skill component 590 indicating the skill component 590 needs further information in addition to what is represented in the received NLU hypothesis.

The post-NLU ranker 565 uses the result data 930 provided by the skill components 590 to alter the NLU processing confidence scores generated by the reranker 990. That is, the post-NLU ranker 565 uses the result data 930 provided by the queried skill components 590 to create larger differences between the NLU processing confidence scores generated by the reranker 990. Without the post-NLU ranker 565, the system may not be confident enough to determine an output in response to a user input, for example when the NLU hypotheses associated with multiple skills are too close for the system to confidently determine a single skill component 590 to invoke to respond to the user input. For example, if the system does not implement the post-NLU ranker 565, the system may not be able to determine whether to obtain output data from a general reference information skill or a medical information skill in response to a user input corresponding to "what is acne."

The post-NLU ranker 565 may prefer skill components 590 that provide result data 930 responsive to NLU hypotheses over skill components 590 that provide result data 930 corresponding to an indication that further information is needed, as well as skill components 590 that provide result data 930 indicating they can provide multiple responses to received NLU hypotheses. For example, the post-NLU ranker 565 may generate a first score for a first skill component **590*a* that is greater than the first skill's NLU confidence score based on the first skill component 590*a* providing result data 930*a* including a response to a NLU hypothesis. For further example, the post-NLU ranker 565 may generate a second score for a second skill component 590*b* that is less than the second skill's NLU confidence score based on the second skill component 590*b* providing result data 930*b* indicating further information is needed for the second skill component 590*b* to provide a response to a NLU hypothesis. Yet further, for example, the post-NLU ranker 565 may generate a third score for a third skill component 590*c* that is less than the third skill's NLU confidence score based on the third skill component 590*c* providing result data 930*c* indicating the third skill component 590*c*** can provide multiple responses to a NLU hypothesis.

The post-NLU ranker 565 may consider other data 920 in determining scores. The other data 920 may include rankings associated with the queried skill components 590. A ranking may be a system ranking or a user-specific ranking. A ranking may indicate a veracity of a skill from the perspective of one or more users of the system. For example, the post-NLU ranker 565 may generate a first score for a first skill component **590*a* that is greater than the first skill's NLU processing confidence score based on the first skill component 590*a* being associated with a high ranking. For further example, the post-NLU ranker 565 may generate a second score for a second skill component 590*b* that is less than the second skill's NLU processing confidence score based on the second skill component 590*b*** being associated with a low ranking.

The other data 920 may include information indicating whether or not the user that originated the user input has enabled one or more of the queried skill components 590. For example, the post-NLU ranker 565 may generate a first score for a first skill component **590*a* that is greater than the first skill's NLU processing confidence score based on the first skill component 590*a* being enabled by the user that originated the user input. For further example, the post-NLU ranker 565 may generate a second score for a second skill component 590***b* that is less than the second skill's NLU processing confidence score based on the second skill component 590*b* not being enabled by the user that originated the user input. When the post-NLU ranker 565 receives the NLU results data 985, the post-NLU ranker 565 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 565 may increase the NLU processing confidence score associated with a first skill configured to output visual data and/or decrease the NLU processing confidence score associated with a second skill configured to output audio data.

The other data 920 may include information indicating the veracity of the result data 930 provided by a skill component 590. For example, if a user says "tell me a recipe for pasta sauce," a first skill component 590*a* may provide the post-NLU ranker 565 with first result data 930*a* corresponding to a first recipe associated with a five star rating and a second skill component 590*b* may provide the post-NLU ranker 565 with second result data 930*b* corresponding to a second recipe associated with a one star rating. In this situation, the post-NLU ranker 565 may increase the NLU processing confidence score associated with the first skill component 590*a* based on the first skill component 590*a* providing the first result data 930*a* associated with the five star rating and/or decrease the NLU processing confidence score associated with the second skill component 590*b* based on the second skill component 590*b* providing the second result data 930*b* associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 565 may increase the NLU processing confidence score associated with a first skill component 590*a* corresponding to a room service skill associated with the hotel and/or decrease the NLU processing confidence score associated with a second skill component 590*b* corresponding to a food skill not associated with the hotel.

The other data 920 may include information indicating a location of the device and/or user that originated the user input. The system may be configured with skill components 590 that may only operate with respect to certain geographic locations. For example, a user may provide a user input corresponding to "when is the next train to Portland." A first skill component 590*a* may operate with respect to trains that arrive at, depart from, and pass through Portland, Oregon. A second skill component 590*b* may operate with respect to trains that arrive at, depart from, and pass through Portland, Maine. If the device and/or user that originated the user input is located in Seattle, Washington, the post-NLU ranker 565 may increase the NLU processing confidence score associated with the first skill component 590*a* and/or decrease the NLU processing confidence score associated with the second skill component 590*b*. Likewise, if the device and/or user that originated the user input is located in Boston, Massachusetts, the post-NLU ranker 565 may increase the NLU processing confidence score associated with the second skill component 590*b* and/or decrease the NLU processing confidence score associated with the first skill component 590*a*.

The other data 920 may include information indicating a time of day. The system may be configured with skill components 590 that operate with respect to certain times of day. For example, a user may provide a user input corresponding to "order me food." A first skill component 590*a* may generate first result data 930*a* corresponding to breakfast. A second skill component 590*b* may generate second result data 930*b* corresponding to dinner. If the system component(s) 120 receives the user input in the morning, the post-NLU ranker 565 may increase the NLU processing confidence score associated with the first skill component 590*a* and/or decrease the NLU processing score associated with the second skill component 590*b*. If the system component(s) 120 receives the user input in the afternoon or evening, the post-NLU ranker 565 may increase the NLU processing confidence score associated with the second skill component 590*b* and/or decrease the NLU processing confidence score associated with the first skill component 590*a*.

The other data 920 may include information indicating user preferences. The system may include multiple skill components 590 configured to execute in substantially the same manner. For example, a first skill component 590*a* and a second skill component 590*b* may both be configured to order food from respective restaurants. The system may store a user preference (e.g., in the profile storage 570) that is associated with the user that provided the user input to the system component(s) 120 as well as indicates the user prefers the first skill component 590*a* over the second skill component 590*b*. Thus, when the user provides a user input that may be executed by both the first skill component 590*a* and the second skill component 590*b*, the post-NLU ranker 565 may increase the NLU processing confidence score associated with the first skill component 590*a* and/or decrease the NLU processing confidence score associated with the second skill component 590*b*.

The other data 920 may include information indicating system usage history associated with the user that originated the user input. For example, the system usage history may indicate the user originates user inputs that invoke a first skill component 590*a* more often than the user originates user inputs that invoke a second skill component 590*b*. Based on this, if the present user input may be executed by both the first skill component 590*a* and the second skill component 590*b*, the post-NLU ranker 565 may increase the NLU processing confidence score associated with the first skill component 590*a* and/or decrease the NLU processing confidence score associated with the second skill component 590*b*.

The other data 920 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle).

Thus, for example, if the user device 110 that originated the user input is moving at or above a threshold speed (e.g., a speed above an average user's walking speed), the post-NLU ranker 565 may increase the NLU processing confidence score associated with a first skill component 590*a* that generates audio data. The post-NLU ranker 565 may also or alternatively decrease the NLU processing confidence score associated with a second skill component 590*b* that generates image data or video data.

The other data 920 may include information indicating how long it took a skill component 590 to provide result data 930 to the post-NLU ranker 565. When the post-NLU ranker 565 multiple skill components 590 for result data 930, the skill components 590 may respond to the queries at different speeds. The post-NLU ranker 565 may implement a latency budget. For example, if the post-NLU ranker 565 determines a skill component 590 responds to the post-NLU ranker 565 within a threshold amount of time from receiving a query from the post-NLU ranker 565, the post-NLU ranker 565 may increase the NLU processing confidence score associated with the skill component 590. Conversely, if the post-NLU ranker 565 determines a skill component 590 does not respond to the post-NLU ranker 565 within a threshold amount of time from receiving a query from the post-NLU ranker 565, the post-NLU ranker 565 may decrease the NLU processing confidence score associated with the skill component 590.

It has been described that the post-NLU ranker 565 uses the other data 920 to increase and decrease NLU processing confidence scores associated with various skill components 590 that the post-NLU ranker 565 has already requested result data from. Alternatively, the post-NLU ranker 565 may use the other data 920 to determine which skill components 590 to request result data from. For example, the post-NLU ranker 565 may use the other data 920 to increase and/or decrease NLU processing confidence scores associated with skill components 590 associated with the NLU results data 985 output by the NLU component 560. The post-NLU ranker 565 may select n-number of top scoring altered NLU processing confidence scores. The post-NLU ranker 565 may then request result data 930 from only the skill components 590 associated with the selected n-number of NLU processing confidence scores.

As described, the post-NLU ranker 565 may request result data 930 from all skill components 590 associated with the NLU results data 985 output by the NLU component 560. Alternatively, the system component(s) 120 may prefer result data 930 from skills implemented entirely by the system component(s) 120 rather than skills at least partially implemented by the skill system component(s) 525. Therefore, in the first instance, the post-NLU ranker 565 may request result data 930 from only skills associated with the NLU results data 985 and entirely implemented by the system component(s) 120. The post-NLU ranker 565 may only request result data 930 from skills associated with the NLU results data 985, and at least partially implemented by the skill system component(s) 525, if none of the skills, wholly implemented by the system component(s) 120, provide the post-NLU ranker 565 with result data 930 indicating either data response to the NLU results data 985, an indication that the skill can execute the user input, or an indication that further information is needed.

As indicated above, the post-NLU ranker 565 may request result data 930 from multiple skill components 590. If one of the skill components 590 provides result data 930 indicating a response to a NLU hypothesis and the other skills provide result data 930 indicating either they cannot execute or they need further information, the post-NLU ranker 565 may select the result data 930 including the response to the NLU hypothesis as the data to be output to the user. If more than one of the skill components 590 provides result data 930 indicating responses to NLU hypotheses, the post-NLU ranker 565 may consider the other data 920 to generate altered NLU processing confidence scores, and select the result data 930 of the skill associated with the greatest score as the data to be output to the user.

A system that does not implement the post-NLU ranker 565 may select the highest scored NLU hypothesis in the NLU results data 985. The system may send the NLU hypothesis to a skill component 590 associated therewith along with a request for output data. In some situations, the skill component 590 may not be able to provide the system with output data. This results in the system indicating to the user that the user input could not be processed even though another skill associated with lower ranked NLU hypothesis could have provided output data responsive to the user input.

The post-NLU ranker 565 reduces instances of the aforementioned situation. As described, the post-NLU ranker 565 queries multiple skills associated with the NLU results data 985 to provide result data 930 to the post-NLU ranker 565 prior to the post-NLU ranker 565 ultimately determining the skill component 590 to be invoked to respond to the user input. Some of the skill components 590 may provide result data 930 indicating responses to NLU hypotheses while other skill components 590 may providing result data 930 indicating the skills cannot provide responsive data. Whereas a system not implementing the post-NLU ranker 565 may select one of the skill components 590 that could not provide a response, the post-NLU ranker 565 only selects a skill component 590 that provides the post-NLU ranker 565 with result data corresponding to a response, indicating further information is needed, or indicating multiple responses can be generated.

The post-NLU ranker 565 may select result data 930, associated with the skill component 590 associated with the highest score, for output to the user. Alternatively, the post-NLU ranker 565 may output ranked output data 925 indicating skill components 590 and their respective post-NLU ranker rankings. Since the post-NLU ranker 565 receives result data 930, potentially corresponding to a response to the user input, from the skill components 590 prior to post-NLU ranker 565 selecting one of the skills or outputting the ranked output data 925, little to no latency occurs from the time skills provide result data 930 and the time the system outputs responds to the user.

If the post-NLU ranker 565 selects result audio data to be output to a user and the system determines content should be output audibly, the post-NLU ranker 565 (or another component of the system component(s) 120) may cause the user device 110*a* and/or the user device 110*b* to output audio corresponding to the result audio data. If the post-NLU ranker 565 selects result text data to output to a user and the system determines content should be output visually, the post-NLU ranker 565 (or another component of the system component(s) 120) may cause the user device 110*b* to display text corresponding to the result text data. If the post-NLU ranker 565 selects result audio data to output to a user and the system determines content should be output visually, the post-NLU ranker 565 (or another component of the system component(s) 120) may send the result audio data to the ASR component 550. The ASR component 550 may generate output text data corresponding to the result audio data. The system component(s) 120 may then cause the user device 110*b* to display text corresponding to the output text data. If the post-NLU ranker 565 selects result text data to output to a user and the system determines content should be output audibly, the post-NLU ranker 565 (or another component of the system component(s) 120) may send the result text data to the TTS component 580. The TTS component 580 may generate output audio data (corresponding to computer-generated speech) based on the result text data. The system component(s) 120 may then cause the user device 110*a* and/or the user device 110*b* to output audio corresponding to the output audio data.

As described, a skill component 590 may provide result data 930 either indicating a response to the user input, indicating more information is needed for the skill component 590 to provide a response to the user input, or indicating the skill component 590 cannot provide a response to the user input. If the skill component 590 associated with the highest post-NLU ranker score provides the post-NLU ranker 565 with result data 930 indicating a response to the user input, the post-NLU ranker 565 (or another component of the system component(s) 120, such as the orchestrator component 530) may simply cause content corresponding to the result data 930 to be output to the user. For example, the post-NLU ranker 565 may send the result data 930 to the orchestrator component 530. The orchestrator component 530 may cause the result data 930 to be sent to the device (110*a*/110*b*), which may output audio and/or display text corresponding to the result data 930. The orchestrator component 530 may send the result data 930 to the ASR component 550 to generate output text data and/or may send the result data 930 to the TTS component 580 to generate output audio data, depending on the situation.

The skill component 590 associated with the highest post-NLU ranker score may provide the post-NLU ranker 565 with result data 930 indicating more information is needed as well as instruction data. The instruction data may indicate how the skill component 590 recommends the system obtain the needed information. For example, the instruction data may correspond to text data or audio data (i.e., computer-generated speech) corresponding to "please indicate ______." The instruction data may be in a format (e.g., text data or audio data) capable of being output by the device (110*a*/110*b*). When this occurs, the post-NLU ranker 565 may simply cause the received instruction data to be output by the device (110*a*/110*b*). Alternatively, the instruction data may be in a format that is not capable of being output by the device (110*a*/110*b*). When this occurs, the post-NLU ranker 565 may cause the ASR component 550 or the TTS component 580 to process the instruction data, depending on the situation, to generate instruction data that may be output by the device (110*a*/110*b*). Once the user provides the system with all further information needed by the skill component 590, the skill component 590 may provide the system with result data 930 indicating a response to the user input, which may be output by the system as detailed above.

The system may include "informational" skill components 590 that simply provide the system with information, which the system outputs to the user. The system may also include "transactional" skill components 590 that require a system instruction to execute the user input. Transactional skill components 590 include ride sharing skills, flight booking skills, etc. A transactional skill component 590 may simply provide the post-NLU ranker 565 with result data 930 indicating the transactional skill component 590 can execute the user input. The post-NLU ranker 565 may then cause the system to solicit the user for an indication that the system is permitted to cause the transactional skill component 590 to execute the user input. The user-provided indication may be an audible indication or a tactile indication (e.g., activation of a virtual button or input of text via a virtual keyboard). In response to receiving the user-provided indication, the system may provide the transactional skill component 590 with data corresponding to the indication. In response, the transactional skill component 590 may execute the command (e.g., book a flight, book a train ticket, etc.). Thus, while the system may not further engage an informational skill component 590 after the informational skill component 590 provides the post-NLU ranker 565 with result data 930, the system may further engage a transactional skill component 590 after the transactional skill component 590 provides the post-NLU ranker 565 with result data 930 indicating the transactional skill component 590 may execute the user input.

In some instances, the post-NLU ranker 565 may generate respective scores for first and second skills that are too close (e.g., are not different by at least a threshold difference) for the post-NLU ranker 565 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 530, post-NLU ranker 565, shortlister component 850, or other component may be trained and operated according to various machine learning techniques.

Figure 10:
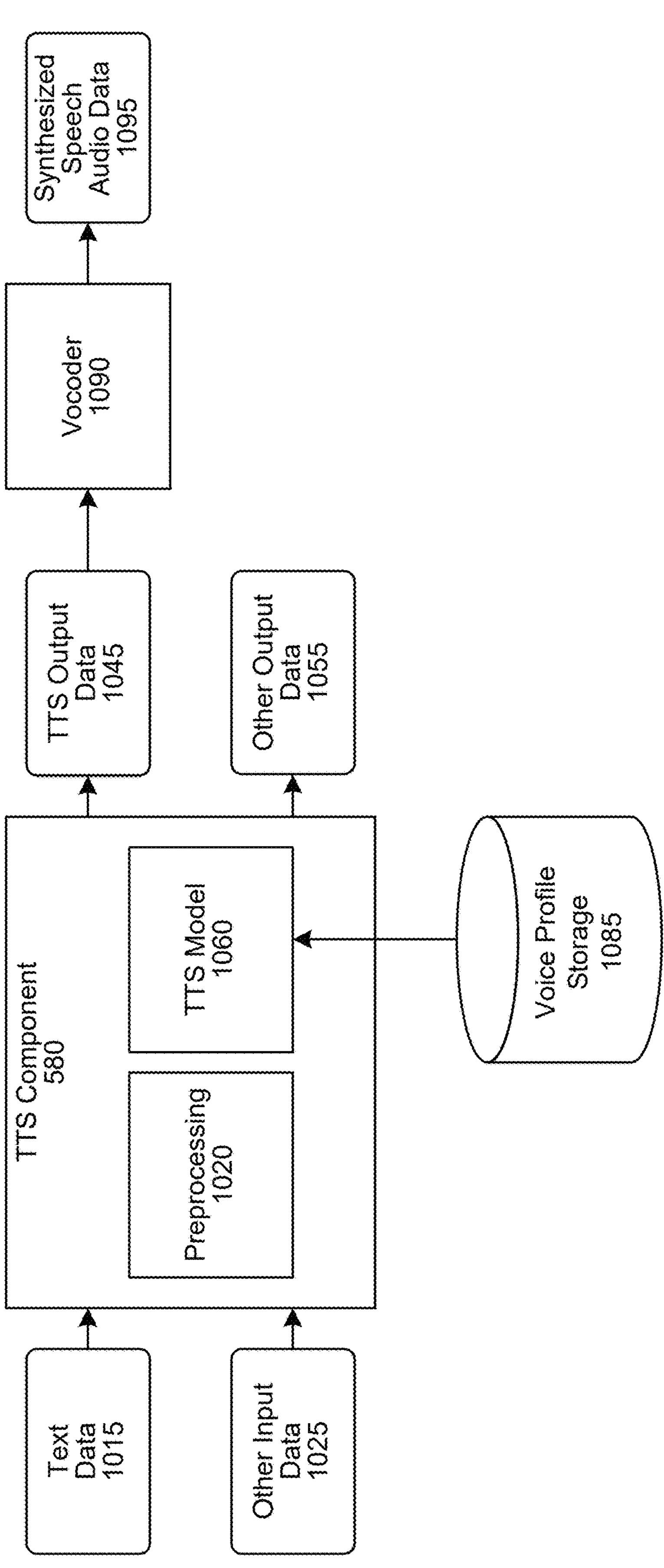
FIG. 10 is a conceptual diagram of text-to-speech components according to embodiments of the present disclosure.

Components of a system that may be used to perform unit selection, parametric TTS processing, and/or model-based audio synthesis are shown in FIG. 10. FIG. 10 is a conceptual diagram that illustrates operations for generating synthesized speech using a TTS component 580, according to embodiments of the present disclosure. The TTS component 580 may receive text data 1015 and process it using one or more TTS models 1060 to generate TTS output data 1045 representing synthesized speech. In some embodiments the TTS output data 1045 may represent synthesized speech in the form of, for example, spectrogram data. In other embodiments, the TTS output data 1045 may comprise other data, for example data representing a latent representation (e.g., embedding data) representing synthesized speech. A vocoder 1090 or other component may convert the TTS output data 1045 into output speech audio data 1095, which may represent a time-domain waveform suitable for amplification and output as audio (e.g., from a loudspeaker).

The TTS component 580 may additionally receive other input data 1025. The other input data 1025 may include, for example, identifiers and/or labels corresponding to a desired speaker identity, voice characteristics, emotion, speech style, etc. desired for the synthesized speech. In some implementations, the other input data 1025 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1015 and/or the other input data 1025 such as metadata accompanying a TTS request and indicating what text should be whispered (or have some other indicated audio characteristic).

The TTS component 580 may include a preprocessing component 1020 that can convert the text data 1015 and/or other input data 1025 into a form suitable for processing by the TTS model 1060. The text data 1015 may be from, for example an application, a skill component (described further below), an NLG component, another device or source, or may be input by a user. The text data 1015 received by the TTS component 580 may not necessarily be text, but may include other data (such as symbols, code, other data, etc.) that may reference text (such as an indicator of a word and/or phoneme) that is to be synthesized. The preprocessing component 1020 may transform the text data 1015 into, for example, a symbolic linguistic representation, which may include linguistic context features such as phoneme data, punctuation data, syllable-level features, word-level features, and/or emotion, speaker, accent, or other features for processing by the TTS component 580. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1015, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1020 may include functionality and/or components for performing text normalization, linguistic analysis, linguistic prosody generation, or other such operations. During text normalization, the preprocessing component 1020 may first process the text data 1015 and generate standard text, converting such things as numbers, abbreviations (such as Apt., St., etc.), symbols ($, %, etc.) into the equivalent of written out words.

During linguistic analysis, the preprocessing component 1020 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1060 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1020 may also identify different grammatical components such as prefixes, suffixes, phrases, punctuation, syntactic boundaries, or the like. Such grammatical components may be used by the TTS component 580 to craft a natural-sounding audio waveform output. The language dictionary may also include letter-to-sound rules and other tools that may be used to pronounce previously unidentified words or letter combinations that may be encountered by the TTS component 580. Generally, the more information included in the language dictionary, the higher quality the speech output.

The output of the preprocessing component 1020 may be a symbolic linguistic representation, which may include a sequence of phonetic units. In some implementations, the sequence of phonetic units may be annotated with prosodic characteristics. In some implementations, prosody may be applied in part or wholly by a TTS model 1060. This symbolic linguistic representation may be sent to the TTS model 1060 for conversion into audio data (e.g., in the form of Mel-spectrograms or other frequency content data format).

The TTS component 580 may retrieve one or more previously trained and/or configured TTS models 1060 from the voice profile storage 1085. A TTS model 1060 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1060 may be stored in the voice profile storage 1085. A TTS model 1060 may represent a particular speaker identity and may be conditioned based on speaking style, emotion, etc. In some implementations, a particular speaker identity may be associated with more than one TTS model 1060; for example, with a different model representing a different speaking style, language, emotion, etc. in some implementations, a particular TTS model 1060 may be associated with more than one speaker identity; that is, be able to produce synthesized speech that reproduces voice characteristics of more than one character. Thus a first TTS model 1060*a* may be used to create synthesized speech for the first speech-processing system component(s) a while a second, different, TTS model 1060*b* may be used to create synthesized speech for the second speech-processing system component(s) b. In some cases, the TTS model 1060 may generate the desired voice characteristics based on conditioning data received or determined from the text data 1015 and/or the other input data 1025. For example a synthesized voice of the first speech-processing system component(s) a may be different from a synthesized voice of the second speech-processing system component(s) b.

The TTS component 580 may, based on an indication received with the text data 1015 and/or other input data 1025, retrieve a TTS model 1060 from the voice profile storage 1085 and use it to process input to generate synthesized speech. The TTS component 580 may provide the TTS model 1060 with any relevant conditioning labels to generate synthesized speech having the desired voice characteristics. The TTS model 1060 may generate spectrogram data 1045 (e.g., frequency content data) representing the synthesized speech, and send it to the vocoder 1090 for conversion into an audio signal.

The TTS component 580 may generate other output data 1055. The other output data 1055 may include, for example, indications or instructions for handling and/or outputting the synthesized speech. For example, the text data 1015 and/or other input data 1025 may be received along with metadata, such as SSML tags, indicating that a selected portion of the text data 1015 should be louder or quieter. Thus, the other output data 1055 may include a volume tag that instructs the vocoder 1090 to increase or decrease an amplitude of the output speech audio data 1095 at times corresponding to the selected portion of the text data 1015. Additionally or alternatively, a volume tag may instruct a playback device to raise or lower a volume of the synthesized speech from the device's current volume level, or lower a volume of other media being output by the device (e.g., to deliver an urgent message).

The vocoder 1090 may convert the spectrogram data 1045 generated by the TTS model 1060 into an audio signal (e.g., an analog or digital time-domain waveform) suitable for amplification and output as audio. The vocoder 1090 may be, for example, a universal neural vocoder based on Parallel WaveNet or related model. The vocoder 1090 may take as input audio data in the form of, for example, a Mel-spectrogram with 80 coefficients and frequencies ranging from 50 Hz to 12 kHz. The synthesized speech audio data 1095 may be a time-domain audio format (e.g., pulse-code modulation (PCM), waveform audio format (WAV), u-law, etc.) that may be readily converted to an analog signal for amplification and output by a loudspeaker. The synthesized speech audio data 1095 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
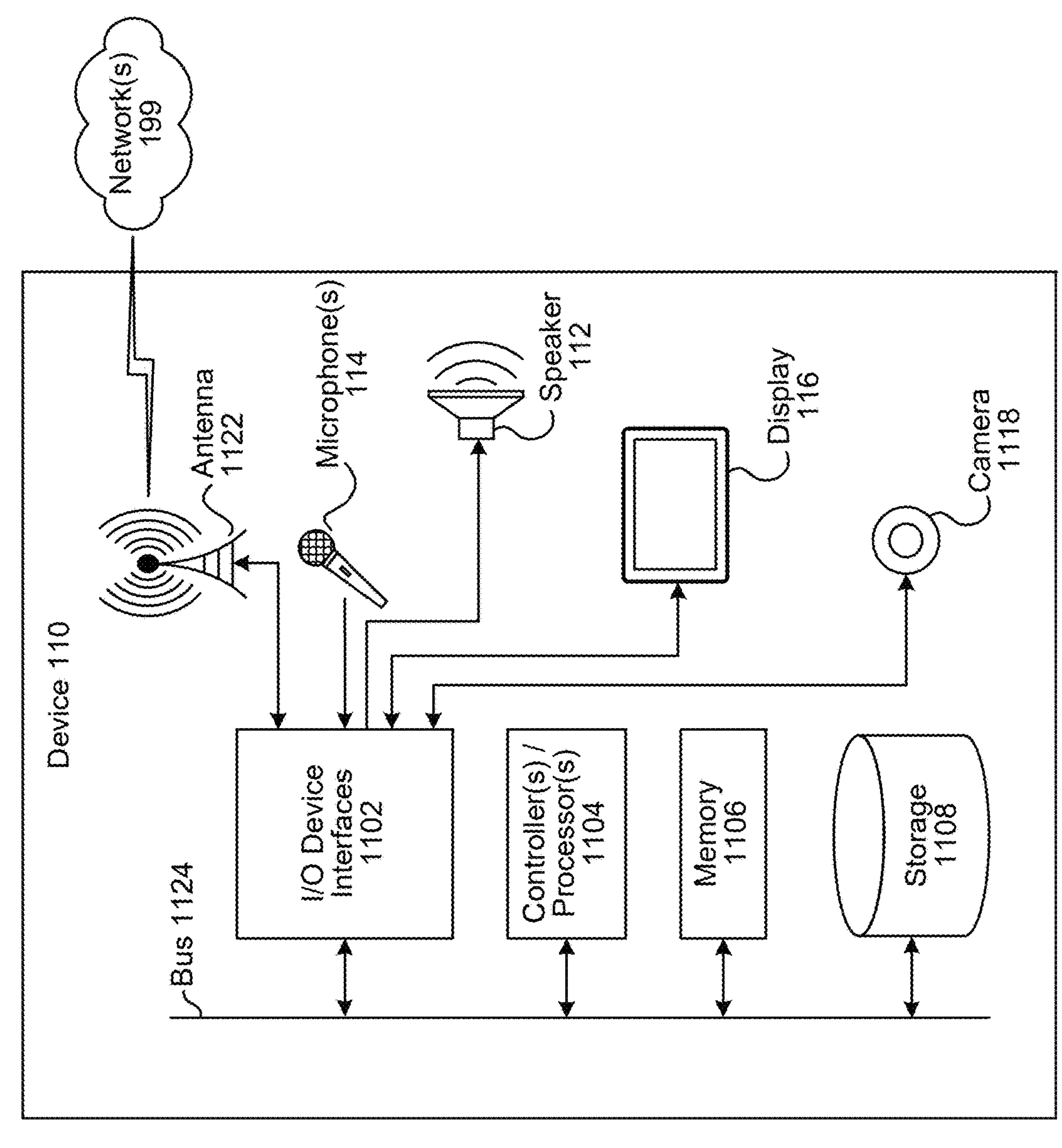
FIG. 11 is a block diagram conceptually illustrating example components of a device, according to embodiments of the present disclosure.
Figure 12:
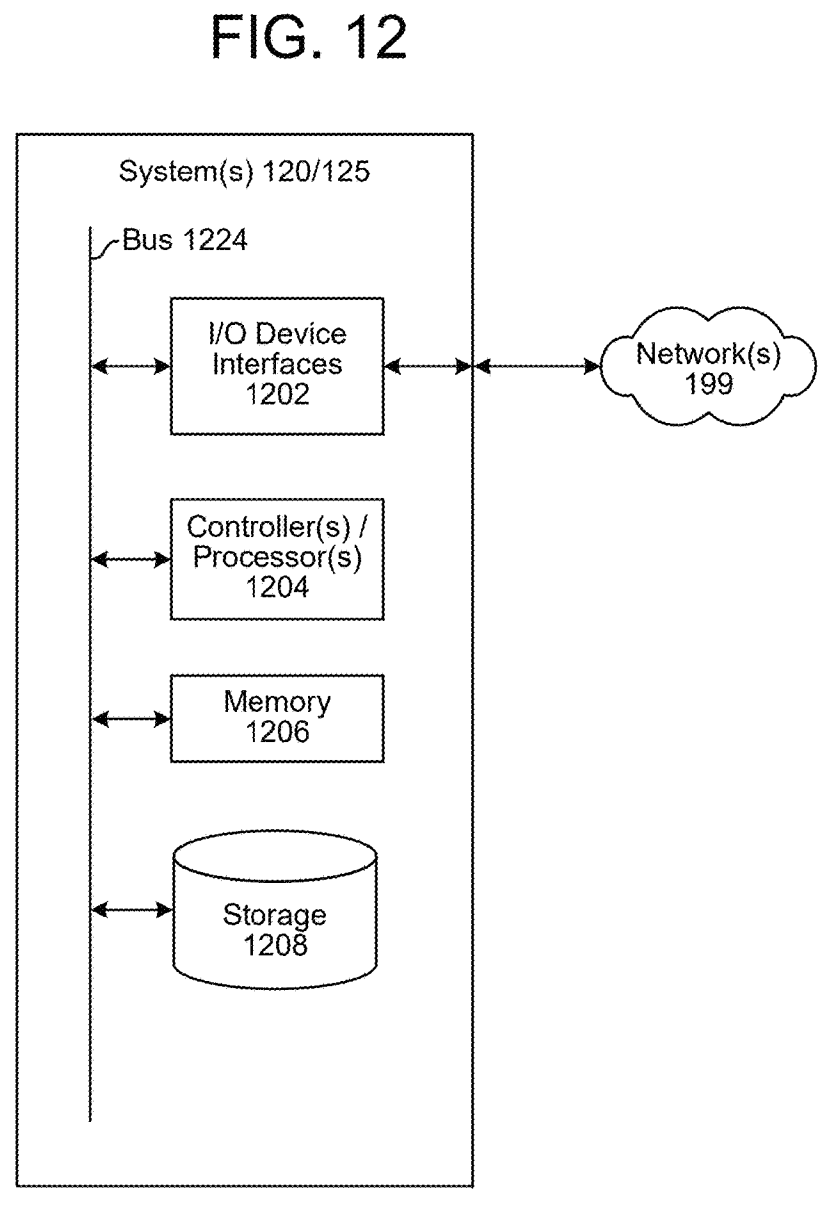

FIG. 11 is a block diagram conceptually illustrating a user device 110 that may be used with the system. FIG. 12 is a block diagram conceptually illustrating example components of a remote device, such as the system component 120, which may assist with ASR processing, NLU processing, etc., and a skill system component 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) he server/system component 120 may be located remotely from the user device 110 as its operations may not require proximity to the user. The server/system component 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). One benefit to the server/system component 120 being in a user's home/business is that data used to process a command/return a response may be kept within the user's home, thus reducing potential privacy concerns.

Multiple systems (120/525) may be included in the overall system 100 of the present disclosure, such as one or more system components 120 for performing ASR processing, one or more system components 120 for performing NLU processing, one or more skill system components 525, etc. In operation, each of these systems may include computer-readable and computer-executable instructions that reside on the respective device (120/525), as will be discussed further below.

Each of these devices (110/120/525) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/525) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1102/1202).

Computer instructions for operating each device (110/120/525) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/525) includes input/output device interfaces (1102/1202). A variety of components may be connected through the input/output device interfaces (1102/1202), as will be discussed further below. Additionally, each device (110/120/525) may include an address/data bus (1124/1224) for conveying data among components of the respective device. Each component within a device (110/120/525) may also be directly connected to other components in addition to (or instead of) being connected to other components across the bus (1124/1224).

Referring to FIG. 11, the user device 110 may include input/output device interfaces 1102 that connect to a variety of components such as an audio output component such as a speaker 112, a wired headset or a wireless headset (not illustrated), or other component capable of outputting audio. The user device 110 may also include an audio capture component. The audio capture component may be, for example, a microphone 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 116 for displaying content. The user device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the system component 120, or a skill system component 525 may include their own dedicated processors, memory, and/or storage. Alternatively, one or more of the components of the device(s) 110, the system component 120, or a skill system component 525 may utilize the I/O interfaces (1102/1202), processor(s) (1104/1204), memory (1106/1206), and/or storage (1108/1208) of the device(s) 110, system component 120, or the skill system component 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system component 120, and a skill system component 525, as described herein, are illustrative, and may be located as a stand-alone device or may be included, in whole or in part, as a component of a larger device or system. As can be appreciated, a number of components may exist either on a system component 120 and/or on user device 110. For example, the language processing components 592 (which may include ASR 550), language output components 593 (which may include NLG 579 and TTS 580), etc., for example as illustrated in FIGS. 5 and 6. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 13, multiple devices (110*a*-110*n*, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110*a*, a speech-detection device with display 110*b*, a smart watch 110*c*, a tablet computer 110*d*, a vehicle 110*e*, a smart phone 110*f*, a display/smart television 110*g*, a washer/dryer 110*h*, a refrigerator 110*i*, a microwave 110*j*, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the system component 120, the skill system component(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the system component 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first data representing a first notification to be delivered to a first user, the first notification corresponding to a first virtual assistant;

receiving second data representing a second notification to be delivered to the first user, the second notification corresponding to a second virtual assistant different from the first virtual assistant;

causing a first device to present a first indication that the first notification is available and a second indication that the second notification is available;

receiving, from the first device, first audio data representing a first spoken request to receive notifications associated with the first virtual assistant;

determining that the first audio data includes a representation of a first wakeword corresponding to the first virtual assistant;

selecting first voice characteristics corresponding to the first virtual assistant;

receiving first synthesized speech corresponding to the first voice characteristics, the first synthesized speech representing content of the first notification;

in response to receiving the first audio data, causing, using the first data, the first device to output the first synthesized speech;

causing the first device to output second synthesized speech having the first voice characteristics and indicating availability of the second notification;

receiving, from the first device, second audio data representing a second spoken request to receive notifications associated with the second virtual assistant; and in response to receiving the second audio data, causing, using the second data, the first device to output third synthesized speech representing the second notification, the third synthesized speech having second voice characteristics, different from the first voice characteristics, corresponding to the second virtual assistant.

2. The computer-implemented method of claim 1, further comprising:

in response to receiving the first audio data, sending, to a speech generation component, the first data and a first token corresponding to the first virtual assistant;

generating, by the speech generation component using the first data and the first token, the first synthesized speech;

in response to receiving the second audio data, sending, to the speech generation component, the second data and a second token corresponding to the first virtual assistant; and generating, by the speech generation component using the second data and the second token, the second synthesized speech.

3. The computer-implemented method of claim 1, further comprising:

determining, by a notification component, that the second notification corresponds to the second virtual assistant different from the first virtual assistant; and based at least in part on the second notification corresponding to the second virtual assistant, selecting the second voice characteristics.

4. The computer-implemented method of claim 1, further comprising:

causing the first device to present a third indication that a third notification corresponding to a third virtual assistant is available;

receiving, from the first device, third audio data representing a third spoken request to receive notifications associated with the third virtual assistant;

detecting, in the third audio data, a first representation of the first wakeword;

in response to detecting the first representation, causing the first device to output fourth synthesized speech having the first voice characteristics and indicating that the first virtual assistant cannot satisfy the third spoken request;

receiving, from the first device, fourth audio data representing a second wakeword corresponding to the third virtual assistant and a fourth spoken request to receive notifications associated with the third virtual assistant; and in response to receiving the fourth audio data, causing the first device to output fifth synthesized speech having third voice characteristics corresponding to the third virtual assistant and representing the third notification.

5. A computer-implemented method comprising:

receiving first data representing a first notification to be delivered to a user, the first notification corresponding to a first virtual assistant;

receiving second data representing a second notification to be delivered to the user, the second notification corresponding to a second virtual assistant different from the first virtual assistant;

causing a first device associated with the user to present a first indication that at least one notification is available;

receiving first input data representing a first request to receive notifications associated with the first virtual assistant;

determining that the first input data includes a representation of a first wakeword corresponding to the first virtual assistant;

selecting first voice characteristics corresponding to the first virtual assistant;

receiving first synthesized speech corresponding to the first voice characteristics, the first synthesized speech representing content of the first notification;

in response to receiving the first input data, causing, using the first data, the first device to present a first output representing the first notification, the first output including the first synthesized speech and having first characteristics corresponding to the first virtual assistant;

causing the first device to present a second output indicating availability of the second notification, the second output having the first characteristics;

receiving second input data representing a second request to receive notifications associated with the second virtual assistant; and in response to receiving the second input data, causing, using the second data, the first device to present a third output representing the second notification, the third output having second characteristics, different from the first characteristics, corresponding to the second virtual assistant.

6. The computer-implemented method of claim 5, further comprising:

in response to determining that the first input data includes the representation of the first wakeword corresponding to the first virtual assistant, selecting the first voice characteristics.

7. The computer-implemented method of claim 5, further comprising:

in response to receiving the first input data, sending the first data to a speech generation component; and generating, by the speech generation component using the first data, the first synthesized speech.

8. The computer-implemented method of claim 5, further comprising:

receiving third input data representing the first wakeword and a third request to receive notifications associated with a third virtual assistant;

causing the first device to present a fourth output having the first characteristics and indicating that a potential error involving the first virtual assistant and the third request;

receiving fourth input data representing a second wakeword corresponding to the third virtual assistant and a fourth request to receive notifications associated with the third virtual assistant; and in response to receiving the fourth input data, causing the first device to present a fifth output having third characteristics corresponding to the third virtual assistant and representing a third notification corresponding to the third virtual assistant.

9. The computer-implemented method of claim 5, further comprising:

determining that the second notification corresponds to the second virtual assistant different from the first virtual assistant; and based at least in part on the second notification corresponding to the second virtual assistant, selecting the second characteristics.

10. The computer-implemented method of claim 9, further comprising:

generating, using the first data and the first voice characteristics, the first synthesized speech, wherein the first output additionally includes first visual content and the first synthesized speech; and generating, using the second data and second voice characteristics corresponding to the second virtual assistant, second synthesized speech representing a second summary of the second notification, wherein the third output includes second visual content and the second synthesized speech.

11. The computer-implemented method of claim 5, further comprising:

in response to receiving the first input data, causing the first device to present a first visual indication corresponding to the first virtual assistant during presentation of the first output;

in response to receiving the second input data, generating second synthesized speech representing the second notification, wherein the third output includes the second synthesized speech; and causing the first device to present a second visual indication, different from the first visual indication, corresponding to the second virtual assistant during presentation of the third output.

12. The computer-implemented method of claim 5, further comprising:

in response to receiving the second data, determining that the user corresponds to the first device and a second device;

determining that a second wakeword associated with the second virtual assistant is enabled for the first device but not the second device; and in response to determining that the second wakeword is enabled for the first device, causing the first device to present a second indication that the second notification is available.

13. A system, comprising:

at least one processor; and at least one memory comprising instructions that, when executed by the at least one processor, cause the system to:

receive first data representing a first notification to be delivered to a user, the first notification corresponding to a first virtual assistant;

receive second data representing a second notification to be delivered to the user, the second notification corresponding to a second virtual assistant different from the first virtual assistant;

cause a first device associated with the user to present a first indication that at least one notification is available;

receive first input data representing a first request to receive notifications associated with the first virtual assistant;

determine that the first input data includes a representation of a first wakeword corresponding to the first virtual assistant;

select first voice characteristics corresponding to the first virtual assistant;

receive first synthesized speech corresponding to the first voice characteristics, the first synthesized speech representing content of the first notification;

in response to receiving the first input data, cause, using the first data, the first device to present a first output representing the first notification, the first output including the first synthesized speech and having first characteristics corresponding to the first virtual assistant;

cause the first device to present a second output indicating availability of the second notification, the second output having the first characteristics;

receive second input data representing a second request to receive notifications associated with the second virtual assistant; and in response to receiving the second input data, cause, using the second data, the first device to present a third output representing the second notification, the third output having second characteristics, different from the first characteristics, corresponding to the second virtual assistant.

14. The system of claim 13, wherein the at least one memory further comprises instructions that, when executed by the at least one processor, further cause the system to:

in response to determining that the first input data includes the representation of the first wakeword corresponding to the first virtual assistant, select the first voice characteristics.

15. The system of claim 13, wherein the at least one memory further comprises instructions that, when executed by the at least one processor, further cause the system to:

in response to receiving the first input data, send the first data to a speech generation component; and generate, by the speech generation component using the first data, the first synthesized speech.

16. The system of claim 13, wherein the at least one memory further comprises instructions that, when executed by the at least one processor, further cause the system to:

receive third input data representing the first wakeword and a third request to receive notifications associated with a third virtual assistant;

cause the first device to present a fourth output having the first characteristics and indicating that a potential error involving the first virtual assistant and the third request;

receive fourth input data representing a second wakeword corresponding to the third virtual assistant and a fourth request to receive notifications associated with the third virtual assistant; and in response to receiving the fourth input data, cause the first device to present a fifth output having third characteristics corresponding to the third virtual assistant and representing a third notification corresponding to the third virtual assistant.

17. The system of claim 13, wherein the at least one memory further comprises instructions that, when executed by the at least one processor, further cause the system to:

determine that the second notification corresponds to the second virtual assistant different from the first virtual assistant; and based at least in part on the second notification corresponding to the second virtual assistant, select the second characteristics.

18. The system of claim 17, wherein the at least one memory further comprises instructions that, when executed by the at least one processor, further cause the system to:

generate, using the first data and the first voice characteristics, the first synthesized speech, wherein the first output additionally includes first visual content and the first synthesized speech; and generate, using the second data and second voice characteristics corresponding to the second virtual assistant, second synthesized speech representing a second summary of the second notification, wherein the third output includes second visual content and the second synthesized speech.

19. The system of claim 13, wherein the at least one memory further comprises instructions that, when executed by the at least one processor, further cause the system to:

in response to receiving the first input data, cause the first device to present a first visual indication corresponding to the first virtual assistant during presentation of the first output;

in response to receiving the second input data, generate second synthesized speech representing the second notification, wherein the third output includes the second synthesized speech; and cause the first device to present a second visual indication, different from the first visual indication, corresponding to the second virtual assistant during presentation of the third output.

20. The system of claim 13, wherein the at least one memory further comprises instructions that, when executed by the at least one processor, further cause the system to:

in response to receiving the second data, determine that the user corresponds to the first device and a second device;

determine that a second wakeword associated with the second virtual assistant is enabled for the first device but not the second device; and in response to determining that the second wakeword is enabled for the first device, cause the first device to present a second indication that the second notification is available.

* * * * *